US009531247B2

(12) United States Patent
Kuznetsov

(10) Patent No.: US 9,531,247 B2
(45) Date of Patent: Dec. 27, 2016

(54) INERTIAL ENERGY STORAGE SYSTEM AND HYDRO-FLUORO-ETHER POWER TRANSFORMER SCHEME FOR RADAR POWER SYSTEMS AND LARGE PFN CHARGING

(71) Applicant: Raytheon Company, Waltham, MA (US)

(72) Inventor: Stephen Kuznetsov, Marlborough, MA (US)

(73) Assignee: Raytheon Company, Waltham, MA (US)

(*) Notice: Subject to any disclaimer, the term of this patent is extended or adjusted under 35 U.S.C. 154(b) by 260 days.

(21) Appl. No.: 14/245,754

(22) Filed: Apr. 4, 2014

(65) Prior Publication Data
US 2015/0288271 A1 Oct. 8, 2015

(51) Int. Cl.
*H02K 47/22* (2006.01)
*H01F 27/18* (2006.01)
(Continued)

(52) U.S. Cl.
CPC ............ *H02K 47/22* (2013.01); *H01F 27/18* (2013.01); *H02K 7/025* (2013.01); *H02K 9/20* (2013.01); *H02P 9/14* (2013.01); *H02P 25/22* (2013.01)

(58) Field of Classification Search
CPC ......... Y02E 60/16; H02K 7/025; H02K 47/22; H02K 9/20; H01F 27/18
(Continued)

(56) References Cited

U.S. PATENT DOCUMENTS 1,646,823 A 10/1927 Karapetoff
2,149,082 A 2/1939 Buell et al.
(Continued)

FOREIGN PATENT DOCUMENTS

EP 0849170 A1 6/1998

OTHER PUBLICATIONS

"Vaporization Cooling for Power Transformers," P. Narbut, et al. Transaction of the AIEE, Power Apparatus & Systems, Part III, Dec. 1959, pp. 1319-1325.
(Continued)

*Primary Examiner* — Tulsidas C Patel
*Assistant Examiner* — Sean Gugger

(57) ABSTRACT

A multi-port storage system includes a dynamo-electric machine with integral rotor inertia forming a primary energy storage system. The dynamo-electric machine has a primary stator winding configured to accept multiple AC input power sources, and has at least two secondary stator windings configured to deliver electric power to multiple loads at different power, frequency and voltage levels. A secondary energy storage system is coupled to the primary energy storage system, and is configured to convert its stored energy to electric power. The dynamo-electric machine is configured to enhance and buffer the secondary energy storage system, and is configured to improve the conversion of the stored energy to electric power. The system may include a step-up transformer responsively coupled to one of the secondary stator windings. The step-up transformer may comprise a single phase or polyphase step-up transformer having internal cooling and electrical insulation between the secondary windings comprising a hydro-fluoro-ether (HFE) vapor and liquid fluid.

23 Claims, 16 Drawing Sheets

(51) Int. Cl.
H02K 7/02 (2006.01)
H02K 9/20 (2006.01)
H02P 9/14 (2006.01)
H02P 25/22 (2006.01)

(58) Field of Classification Search
USPC .................................................. 322/4, 63
See application file for complete search history.

(56) References Cited

U.S. PATENT DOCUMENTS

| | | | |
|---|---|---|---|
| 2,740,510 A | 4/1956 | Berthold | |
| 3,024,298 A | 7/1958 | Goltsos et al. | |
| 3,004,381 A | 10/1961 | Schweitzer | |
| 3,183,431 A | 5/1965 | Ford | |
| 3,187,250 A | 6/1965 | Born et al. | |
| 3,315,148 A | 4/1967 | Grillo | |
| 3,452,229 A | 6/1969 | Pimlott et al. | |
| 3,571,693 A | 3/1971 | Riaz | |
| 3,667,012 A * | 5/1972 | Kilgore | H02P 27/05 318/161 |
| 4,001,666 A | 1/1977 | Grenfell | |
| 4,011,535 A | 3/1977 | Kosky et al. | |
| 4,048,603 A * | 9/1977 | Staub | H01F 27/18 165/104.25 |
| 4,393,964 A | 7/1983 | Kemper | |
| 4,439,720 A | 3/1984 | Georges | |
| 4,444,444 A | 4/1984 | Benedetti et al. | |
| 4,612,494 A * | 9/1986 | Kawamura | H02J 15/00 310/74 |
| 4,926,107 A * | 5/1990 | Pinson | H02J 3/30 310/74 |
| 4,971,522 A | 11/1990 | Butlin | |
| 5,097,194 A | 3/1992 | Walton et al. | |
| 5,646,458 A * | 7/1997 | Bowyer | H02J 9/066 290/4 A |
| 5,921,505 A * | 7/1999 | Spector | B64G 1/28 244/165 |
| 6,023,152 A | 2/2000 | Briest et al. | |
| 6,078,119 A | 6/2000 | Satoh et al. | |
| 6,239,513 B1 * | 5/2001 | Dean | H02J 9/066 307/64 |
| 6,573,626 B1 | 6/2003 | Gosebruch et al. | |
| 6,710,579 B2 | 3/2004 | Ebel et al. | |
| 7,663,328 B2 | 2/2010 | Gonder | |
| 7,710,081 B2 * | 5/2010 | Saban | H02K 3/28 290/4 R |
| 2005/0012395 A1 * | 1/2005 | Eckroad | H02J 3/16 307/44 |
| 2008/0103632 A1 * | 5/2008 | Saban | H02K 3/28 700/286 |
| 2009/0134705 A1 | 5/2009 | Kalev | |
| 2011/0084568 A1 | 4/2011 | Lateb et al. | |
| 2012/0187922 A1 * | 7/2012 | Dubois | F16F 15/305 322/4 |
| 2012/0286523 A1 | 11/2012 | Hull et al. | |
| 2013/0020893 A1 | 1/2013 | Bradley et al. | |
| 2013/0127391 A1 | 5/2013 | Lewis | |
| 2013/0257186 A1 | 10/2013 | Kozar et al. | |
| 2013/0260999 A1 | 10/2013 | Hull et al. | |
| 2013/0261001 A1 | 10/2013 | Hull et al. | |
| 2013/0285491 A1 * | 10/2013 | Kuznetsov | H02P 25/22 310/71 |
| 2014/0346868 A1 | 11/2014 | Kuznetsov | |

OTHER PUBLICATIONS

"Design and Performance Characteristics of Gas/Vapor Transformers," Trans. IEEE, Power Apparatus & Systems, vol. PAS-101, Jul. 1982, pp. 2167-2170.
International Search Report, dated Sep. 2, 2015, in connection with International Application No. PCT/US2015/017264, 5 pages.
Written Opinion of the International Searching Authority, dated Sep. 2, 2015, in connection with International Application No. PCT/US2015/017264, 7 pages.
3M Electronics, Product Information, "3M Novec 649 Engineered Fluid", < URL: http://solutions.3mmagyar.hu/3MContentRetrievalAPI/Blob Servlet?Imd=1351678101000&locale=hu_HU&asset Type=MMM_Image&assetid=1319241050803&blobAttribute=ImageFile> Sep. 9, 2009, 4 pages.
Walls, W.A., "Rotating machines for pulsed power", IEEE Xplore Abstract, Conference Record of the 25th International Symposium and 2002 High-voltage Workshop, Jun. 30-Jul. 3, 2002, 8 pages, IEEE, New York, N.Y.
Kuznetsov, S.; U.S. Patent Application entitled "Electro-Mechanical Kinetic Energy Storage Device and Method of Operation" U.S. Appl. No. 13/458,586, filed Apr. 27, 2012, 38 pgs.
Kuznetsov, S.; U.S. Patent Application entitled "Method and Apparatus for Control of Pulsed Power in Hybrid Energy Storage Module"; U.S. Appl. No. 14/591,695, filed Jan. 7, 2015; 47 pages.
Kuznetsov, S.; U.S. Patent Application entitled "System and Method for Parallel Configuration of Hybrid Energy Storage Module", U.S. Appl. No. 14/711,632, filed May 13, 2015, 55 pgs.
International Search Report and Written Opinion issued for PCT/US2016/012513, dated May 30, 2016, 11 pgs.
L.A. Kilgore et al., "Energy Storage at Site Permits Use of Large Excavators on Small Power Systems", Westinghouse Engineer, Nov. 1970, vol. 30 No. 6, pp. 162-167.
Limpaecher, et al. "Resonant Link PFN Charger and Modular Power Supply" Science Application International Corporation Electrical Power Technology Division, IEEE, 2007; pp. 1495-1499.
Narbut, et al.; "Vaporization Cooling for Power Transformers" Transaction of the AIEE; Power Apparatus & Systems, Part III; Dec. 1959; 7 pages.
Moore, et al.; "Design and Performance Characteristics of Gas/Vapor Transformers"; Trans. IEEE; Power Apparatus & Systems; vol. PAS-101; Jul. 1982; 4 pages.
Mike Strasik, "Flywheel Electricity Systems with Superconducting Bearings for Utility Applications," Boeing Phantom Works, Jul. 28, 2004, 32 pages.

* cited by examiner

FIG. 12

INERTIAL ENERGY STORAGE SYSTEM AND HYDRO-FLUORO-ETHER POWER TRANSFORMER SCHEME FOR RADAR POWER SYSTEMS AND LARGE PFN CHARGING

TECHNICAL FIELD

This disclosure is generally related to pulsed power systems at the megawatt level, such as those utilized in radar power systems, and more particularly to an inertial energy storage system and hydro-fluoro-ether power transformer scheme for radar power systems and large PFN charging.

BACKGROUND OF THE DISCLOSURE

Conventional pulsed power energy storage systems use air or oil-cooled transformers for high voltage step-up. These are limited in power density due to either low cooling efficiency or low dielectric density.

Prior technologies include fluoro-carbon fluids such as FC-72 and FC-77 for transformer cooling with two-phase vapor/liquid, such as for 60 Hz steady-state transformers with vapor cooling. Some refrigerants will evaporate in a sealed chamber until the vapor pressure in the system is at a pressure corresponding to its environmental temperature. These fluids are not suitable for pulsed power megawatt level systems, including those operating at frequencies such as 20,000 Hz.

Advances in hydro-fluoro-ether (HFE) chemistry now permit HFE fluids to be used profitably for insulating and cooling high voltage mega-watt rated power transformers, such as for radar pulsed power or electromagnetic pulsed power. The combination of an HFE insulated/cooled transformer with an inertial energy storage device produces a regenerative system with power/energy densities required by government programs, and allows a safe and efficient interface with high density lithium battery energy storage systems.

Pulsed power at the megawatt level requires new topologies for the magnetics of the transformer and the electrical machinery, as well as enhanced cooling to reduce component critical temperatures, extend lifetime and allow faster repetition rates for an effector. A new excitation scheme for the inertial storage module results in a significantly faster rate-of-rise of output voltage and power.

SUMMARY OF THE DISCLOSURE

To address one or more of the above-deficiencies of the prior art, one embodiment described in this disclosure provides an inertial energy storage system and hydro-fluoro-ether power transfer scheme, such as for radar power systems and large pulse forming network (PFN) charging.

According to one embodiment of the disclosure, a multi-port storage system includes a dynamo-electric machine with integral rotor inertia forming a primary energy storage system. The dynamo-electric machine has a primary stator winding configured to accept multiple AC input power sources, and has at least two secondary stator windings configured to deliver electric power to multiple loads at different power, frequency and voltage levels. A secondary energy storage system is coupled to the primary energy storage system, and is configured to convert its stored energy to electric power. The dynamo-electric machine is configured to enhance and buffer the secondary energy storage system, and is configured to improve the conversion of the stored energy to electric power.

In some embodiments, the system comprises a step-up transformer responsively coupled to one of the secondary stator windings. The step-up transformer may comprise a single phase or polyphase step-up transformer having internal cooling and electrical insulation between the secondary windings comprising a hydro-fluoro-ether (HFE) vapor and liquid fluid. In some embodiments, the system comprises a power electronic frequency or voltage level converter coupled to the dynamo-electric machine that is cooled and insulated by a hydro-fluoro-ether (HFE) vapor and liquid fluid. In some embodiments, the primary stator winding and the secondary stator windings of the dynamo-electric machine are cooled by a hydro-fluoro-ether (HFE) liquid fluid. In some embodiments, the step-up transformer, the power electronic converter and the stator windings of the dynamo-electric machine are cooled by a hydro-fluoro-ether (HFE) vapor and liquid fluid in a common cooling loop, wherein the HFE fluid is configured to transform from a fluid state to a vapor state in a last stage of use. In some embodiments, the dynamo-electric motor has a plurality of primary windings.

In some embodiments, the step-up transformer has a primary winding and a plurality of secondary windings disposed about a common segmented core, wherein the HFE vapor and liquid fluid is disposed between sections of the segmented core. The dynamo-electric machine may further include a tertiary winding configured to provide a fast ramp rate for output power provided by the dynamo-electric motor.

In some embodiments, the dynamo-electric machine comprises a first drive motor and a second drive motor connected in series and an inertial flywheel, wherein the first and second drive motors are configured to power the inertial flywheel. The system may comprise a variable frequency drive (VFD) configured to convert a first frequency to a second higher frequency, and feed the first and second drive motors. The first and second drive motors may be configured to be counter-rotating. The system may comprise a heat exchanger/condenser configured to process the HFE vapor and liquid fluid.

The system may be configured to recover load energy.

Although specific advantages have been enumerated above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 12 shows a hybrid energy storage system (HESS) as applied to a ship with a synchronous modulator/inertial energy storage, battery energy storage, hybrid electric drive with slowly fluctuating load and a conventional pulsed load;

DETAILED DESCRIPTION

It should be understood at the outset that, although example embodiments are illustrated below, the present invention may be implemented using any number of techniques, whether currently known or not. The present invention should in no way be limited to the example implementations, drawings, and techniques illustrated below. Additionally, the drawings are not necessarily drawn to scale.

This disclosure provides several new magnetic configurations for a main electrical power apparatus. Moreover, this disclosure provides several unique combinations of step-up transformers, rectifiers, electrical machinery and other subsystems to an inertial storage system which benefits from advanced HFE (Novec) cooling in a common thermal loop. Advanced cooling reduces component critical temperatures, extends lifetime and allows faster rep-rates for an electromagnetic effector.

The system as a whole is first described and illustrates the need for high voltage transformation, which ultimately requires advanced cooling for compact & highly efficient power transformation/conditioning for pulsed power.

Figure 1:
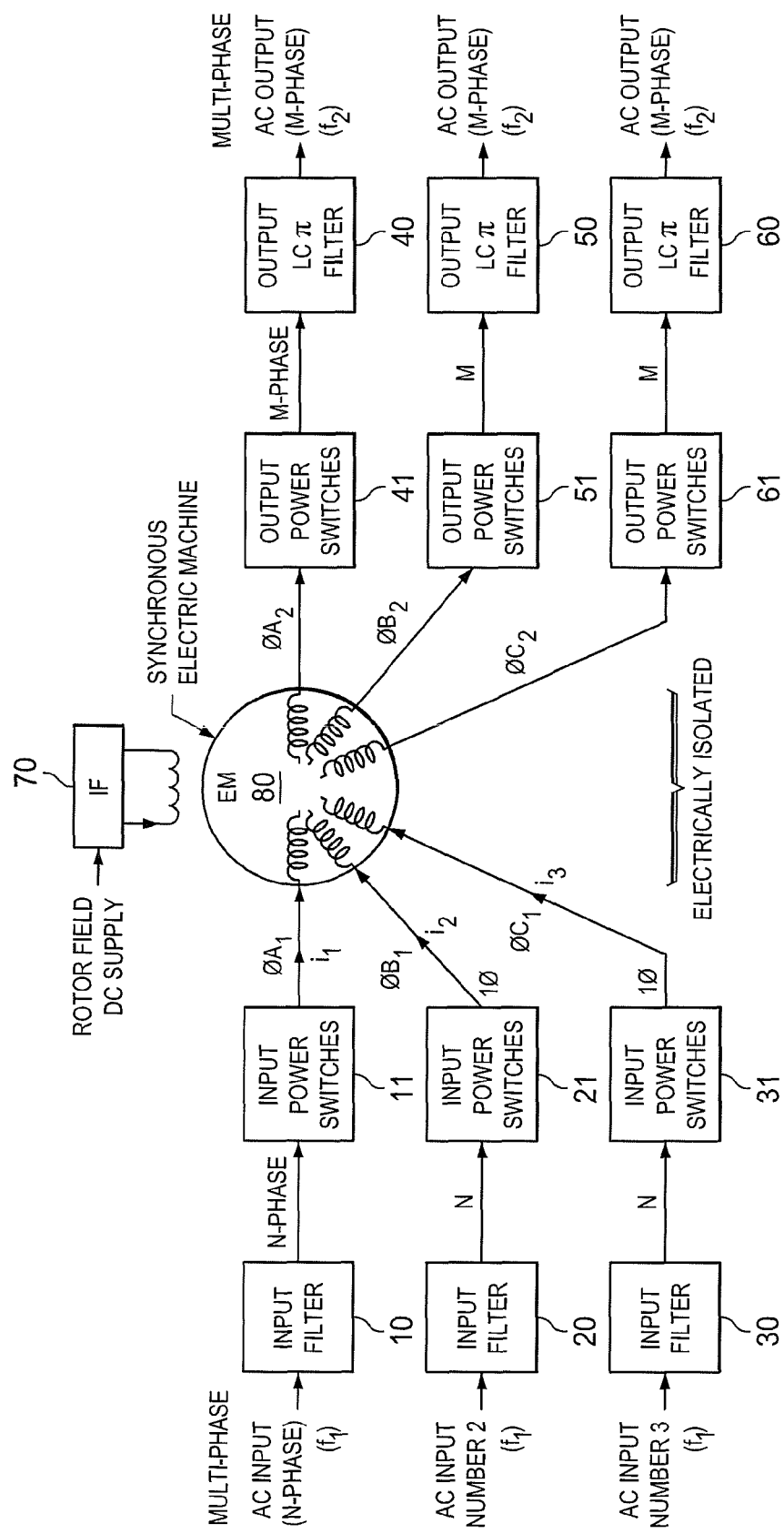
FIG. 1 shows a generalized system of multi-port multi-phase power conditioning through a wound-field synchronous electrical machine with means for inertial energy storage with allowance for multiple output frequencies.

FIG. 1 shows a generalized system of multi-port multi-phase power conditioning through a wound-field synchronous electrical machine with means for inertial energy storage with allowance for multiple output frequencies. Power input polyphase filters are shown at 10, 20 and 30. Input power electronic switches are shown at 11, 21 and 31. Power electronic output switches are shown at 41, 51 and 61. Output polyphase L-C power filters are shown at 40, 50 and 60. A rotor field DC power supply is shown at 70, and an inertial energy storage (IES) device integrated with an electrical machine (EM) is shown at 80. All inputs and outputs to the electrical machine are galvanically isolated.

This disclosure describes four of the above subsystems in more detail due to numerous innovative design changes made.

This disclosure includes a solution to an industry problem which originates with a limitation on existing turbine generators not being able to accommodate large swings in either power or energy demand with repetitive pulsed loads. Conventional turbine generators have a sub-transient reactance, a transient reactance and a synchronous reactance which changes according to how fast the load current is applied. When a fast load is applied, the generator exhibits the lowest of these series reactances, the sub-transient reactance, which yields the highest available current but also causes severe fluctuations of the AC line voltage on the entire power system, which may adversely affect communication and control equipment. Although effective passive (R-C or L-C) filters are available for high frequency load fluctuations, the low frequency power fluctuations are difficult and inefficient to filter and accordingly this disclosure provides a solution to remove low frequency power fluctuations by use of the IES 80.

The IES 80 is designed to store an upper energy level of E1 and to deliver over a prescribed period a fixed quantity of energy E2 to buffer load energy changes from propagating to the source. In the interests of high density systems, the IES 80 may be a high speed flywheel directly coupled to a high speed synchronous generator with polyphase output. In a preferred embodiment, the generator and the IES 80 are direct in-line on the same shaft, although in alternative embodiments the IES 80 may turn at a speed different from the high speed generator and have a speed reduced or speed increased between these two subsystems to handle differing operating speeds. The IES 80 has two principal end speeds: S1 is the radian shaft speed at the lowest operating point and S2 is the radian shaft speed at the highest of the operating speeds. The energy E2 extracted from the IES 80 in a particular discharge period is calculated as:

$$E2=0.50*(S2-S1)*J^2$$

where J is the moment of inertia of this system and S1 & S2 are in radians/s units.

As a minimum, energy E2 must exceed one cycle to cycle load energy fluctuations. In some cases, the energy E2 must be greater than 100 times the cycle to cycle energy fluctuations. The latter case requires that the IES 80 have an input motor driving source to bring the flywheel up to speed on a continuous basis for which the rating of this drive motor is close to the continuous power rating of the system. In one preferred embodiment (FIG. 14), the IES 80 is composed of a carbon-fiber composite or S-glass flywheel arranged in a drum assembly with principal inertia at the rim. The bearings are magnetic 4 axis self-centering bearings that have controllable damping as further described in prior art.

In a preferred embodiment, the operating range from S1 to S2 is kept within a definite range so as to minimize large speed excursions which could possibly pass through one or greater critical speeds of the flywheel-generator set. For example, if the first critical mechanical speed is at 60% of S2, the lowest value of S1 should be about 70% of S2 and the safe operating range defined from 70% to 100% speed on a recurring basis. In this example, the second critical speed would most likely be above 120% of the base speed and would never be reached in practice. Furthermore, constraints are imposed by mechanical limits that prefer the operating speed range be limited to a band such as 70-100% rather than 10-100% in order to improve mean time between failure (MTBF) and avoid premature bearing failure.

The EM of IES 80 may also be a synchronous electrical machine with a permanent magnet field and has mechanically attached to it a means for inertial storage with rotating energy Er. The EM is operated in a variable speed mode by input frequency regulation depending on the level of energy required to be stored in the inertial mass. The rotor is operated in a vacuum chamber to reduce windage losses and is part of the same vacuum chamber as the flywheel rotor. The variable speed drive (VSD) powering the EM allows the machine to deliver real power or absorb real power and also to deliver or absorb reactive power from the input source. The VSD provides power factor regulation of the input power on a cycle by cycle basis. The response time of the EM to deliver or absorb energy is on the order of cycles, typically 2 cycles, which, for example, is 5 milliseconds on a 400 Hz machine and is inherently much faster than an electrochemical cell in absorbing (recharging) energy.

The input side of the EM has a multiport polyphase connection. There can be, as shown, 3 input power sources coming from 3 independent turbine generators or 3 separate power busses so that if one or two busses are de-energized due an external equipment failure, the EM can still operate on one source input and power the IES 80 in a recharge or discharge mode. Blocks 11, 21 and 31 are each variable speed drives with polyphase output each feeding multiple primary windings of the EM. In the sample system shown, the VSD output 0-600 Hz for powering a 4 pole synchronous machine up to a maximum speed of 18,000 rpm.

The EM in this disclosure is special as it has a second set of stator windings, termed the secondary windings, which are electrically isolated from the primary windings but magnetically coupled to the primary windings by rotor action and a minor amount of stator leakage flux. These stator secondary windings are shown as A2, B2 and C2 and by themselves are poly-phase windings and each is connected to the separate output power switches 41, 51, 61 creating an m-phase polyphase system. These switches do not perform frequency conversion but are used for fault isolation, safety control and for selecting which loads are to be powered in any given mode. The input number of phases "n" is distinct and different from the output number of phases "m". Also, the voltage level of the output phases is entirely independent of the input voltage level. Each output phase has a Pi-filter inductive-capacitive network shown at 40, 50, and 60. The output frequency of the EM is, in a preferred embodiment, a higher frequency than the input source, and may or may not be higher than the VSD output frequency. Below are shown sample parameters, where the 18,000 rpm EM output frequency is chosen to be 1200 Hz for an input frequency of 600 Hz by having 4 poles on the primary windings and 8 poles on the secondary windings.

Sample Characteristics of a two input port, three output port inertial energy storage, electro-mechanical power conversion and transformation system for fast rise time output pulse duty:

Electrical Machine
Permanent Magnet Rotor, Synchronous Motor/Generator
Number of poles on input windings: 4
Number of poles on output windings: 8
Magnetic configuration: radial flux
Permanent magnet type: neodymium boron iron
Operating Speed Range: 12726 to 18000 rpm
Input Ports: Two 3-phase windings equally rated and phase shifted by 60 degrees
Input Voltage: 4160 Volts, 60 Hz
Output Ports: Three 3 phase windings equally rated and phase shifted by 45 degrees
Output Voltage: 6.6 kV rms line to line on each winding
Output Frequency: 1200 Hz
Galvanic Isolation Voltage from any input winding to any output winding: 75 kV
Power level: multi-megawatt
Input Variable Speed Drive
Input Frequency: 60 Hz
Output Frequency: 0 to 600 Hz
Power level: multi-megawatt
Inertial Energy Storage Flywheel
Peak Rotational Energy: 100 MJ at 18000 rpm
Rotational Energy at 12726 rpm: 50 MJ
Rotor Material: Composite or S-Glass
Bearings: 4 lobe magnetic bearings with active suspension
First critical speed: Below 10,000 rpm
Second critical speed: Above 20,000 rpm
Directly coupled to electrical machine
Rotor operating in vacuum chamber
Output Step-Up Transformer
Type: Triple Three phase windings, concentric wound, variable frequency, hydro-fluoro-ether insulated
Input Voltage: 3×6600 Volts rms line to line on each winding set
Output Voltage: 3×20 kV rms line to line for input to rectifier system
Cooling System: Two phase flow with HFE or fluoroketone coolant, liquid and gas phases
Galvanic isolation voltage from input to output windings: 120 kV
Input Impedance: 3.5% on each winding
Magnetic core material: Amorphous metal/nano-crystalline
Maximum Input Frequency: 1200 Hz
Power level: multi-megawatt The scheme by virtue of the two separate wavelengths (or winding pole pitches) in the synchronous machine provides for the secondary windings to have an output frequency f2 which is higher than the input frequency f1 by typically a factor of 2:1 or greater, thereby allowing the output filtering to be more efficient at the higher frequencies and compact. A further advantage of this disclosure is that the preferred load on the EM is a step-up or step-down transformer for which the higher frequency excitation is a design necessity to permit higher power density and reduce the magnetic core material compared with low frequency transformers. The core ferromagnetic material mass and volume is reduced in inverse proportion to the applied frequency, and thus if a 1200 Hz excitation is used instead of a 60 Hz excitation, the basic core material will be ½0th of the latter case. This is a most significant cost, weight and size reduction for a practical system. Further, the EM ferromagnetic core material is also reduced by having a higher frequency stator excitation in a permanent magnet rotor machine. A third advantage is the output rectifier filtering is more efficient when a 6, 12 or higher pulse number rectifier is used at the higher frequency in conjunction with an electrostatic capacitive output filter for the DC bus. This DC bus may be either low voltage or high voltage to benefit from the high frequency conversion and may feed the radar system or similar pulsed load such as an array of pulse forming networks (PFNs).

In a preferred embodiment the EM has two distinct primary (input) and secondary (output) windings, but it should be appreciated to one skilled in the art that this EM is fully bidirectional and the primary windings can be used for a generating function when the secondary windings are used in a motoring mode for transferring power from the IES back to the input source in a regenerative mode. This regenerative mode may be necessary when the flywheel speed is too high for energy balance conditions, when it is desired to shut down the set or when the output voltage generated by the electrical machine is too high for the intended load.

The EM is designed so that the output windings, irrespective of the number of phases (m), are electrically matched in impedance to the transformer input impedance. This will constitute maximum power transfer between these two subsystems. Further, there is an advantage to matching the voltage output and especially volts/hertz ratio of the EM to the transformer voltage input and volts/hertz design ratio, which sets the magnetic flux level per turn in the transformer core.

In a preferred embodiment, the transformer core is an amorphous metal or nano-crystalline core due to the need for low eddy current and low hysteresis losses at the high operating frequency. Described herein is a novel insulating and cooling technique which is an integral part of this disclosure and allows this technology to excel in power density and performance far beyond conventional power transformer practice.

Figure 2:
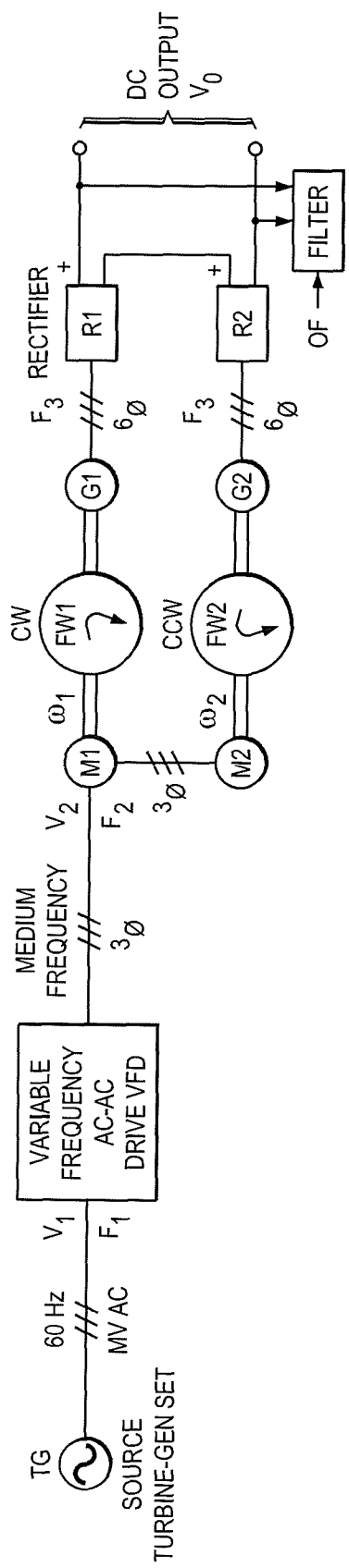
FIG. 2 shows a hybrid energy storage system as applied to a ship radar power system without use of step-up or step down transformers.

FIG. 2 shows a hybrid energy storage system as applied to a ship radar power system without use of step-up or step down transformers. The source generation denoted TG is at a medium voltage level and has a standard line frequency e.g. 60 Hz. Source generation TG feeds a variable frequency drive (VFD) which converts frequency F1 to frequency F2 at the medium voltage level and feeds drive motors M1 and M2 connected in series for powering of the inertial flywheel (FW) storage set. The flywheels are designated as FW1 and FW2 and rotate in opposite directions. Machines M1 and M2 rotate in opposite directions, have identical shaft speeds and are built as permanent magnet synchronous motors. The inertial storage FWs are directly in line with a set of high speed AC polyphase generators G1 and G2 which are wound for a higher number of poles than motors M1 and M2. Consequently, the output frequency of G1 and G2 are higher than the input frequency of motors M1 and M2. For example, the motors M1 and M2 can be 4 pole machines being fed at 600 Hz for an 18,000 rpm shaft speed and generators G1 and G2 can each be wound as 8 pole units with an output frequency of 1200 Hz. Further, the generators G1 and G2 are preferably wound with a higher phase number than three and a higher voltage level which permits e.g. separate wye and delta outputs for advantageous use in the output rectifier system. An objective of this disclosure is to yield a highly compact power system with highly filtered and regulated output power. The preferred embodiment has each generator G1 and G2 with a wye and delta output which is shifted in phase from one another by 15 degrees, and therefore a 12-phase system is shown in FIG. 2 and the rectification is a 24 pulse system.

Each set of wye and delta outputs together feed rectifier subsystems R1 and R2 which are connected in series to form a high voltage DC output in a 24 pulse system. The same concept can also be configured for a 48 pulse system with 4 generators, or a simply and less efficient 12 pulse rectifier system. Rectifiers R1 and R2 may be a diode bridge with a fixed ratio of input to output voltage or a phase controlled bridge which allows modulation of the output voltage and current to suit load or changes in the shaft speed and stored energy. The DC output is filtered in block OF and is applied to a load which may constitute a PFN or electromagnetic effector. The described system has very fast response times for a high power system and because in the example 12-phase system, there is a minimum of capacitive filtering required, consequently the time constant associated with highly capacitive systems are not present allowing for fast output voltage and current response. The described configuration forms a mechanically and electrically balanced system since the EMs are synchronous and fed equal frequencies from the VFD yielding equal shaft and flywheel speeds and therefore equal energy storage response from each inertial subsystem. The preferred VFD is an AC Resonant Link with medium AC voltage e.g. 4160 Volt AC input and 2400 Volts AC output, 3-phase which is divided equally between the two EM motors, the AC Link drive providing unity power factor at the source terminals, regenerative power capability and substantially sinusoidal voltage and current at its source connection with less than 1.5% total harmonic distortion. The voltage ratio from input to output of 4160/2400 or 1.732 is obtainable in an AC Resonant Link drive without having an integral step-down transformer which simplifies design and enhances power density.

One intended use of this disclosure is unique in that it is able to smooth both fast pulsing loads and slowly changing loads with equal precision and efficiency.

Figure 3:
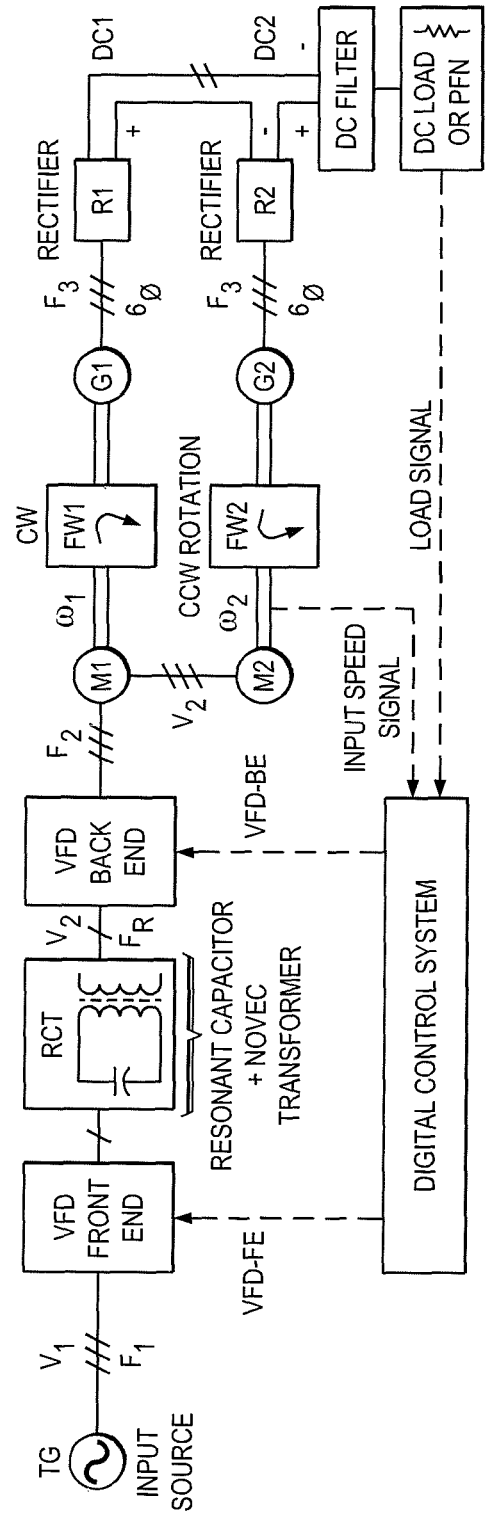
FIG. 3 shows a variation on FIG. 2 whereby the input source is a higher level of voltage.

FIG. 3 shows a variation on FIG. 2 whereby the input source is a higher level of voltage, such as 13.8 kV, 3-phase, 60 Hz and it is desired to limit the input stator voltages on the motor stators for the energy storage system to a significantly lower voltage, such as 2400 Volts, for purposes of optimizing the magnetic design of the electric machinery. This requires the inclusion of a step-down transformer within the frame of an AC Link Inverter on the load side of the main resonant capacitor shown as block RCT for resonant capacitor-transformer. The RCT is electrically positioned in between the VFD front end switching network (VFD-FE) and the VFD back end switching network (VFD-BE) and operates at a significantly higher frequency FR than either the input source F1 or the output frequency F2. To maintain excellent harmonic reduction, the FR can be a minimum fifty times the input frequency and a minimum of twenty times the output frequency which is typically a higher than the input frequency. FIG. 3 shows a resonant transformer-coupled AC-link energy storage system with counter-rotating machines for shipboard application to high power electromagnetic effectors. The output is a DC Load or Pulse Forming Network (PFN). The pulse forming network has the ability to produce essentially square wave output into loads with varying resistance and inductance as a function of time.

This circuit permits the transformer inside the RCT block to be either step-up or step down depending on input voltage source level. The RCT transformer component is a single-phase unit despite the input and output lines being polyphase. The table below shows an example of 3 standard input voltages and the sample transformer levels and frequencies for a multi-megawatt drive.

| Case | Input Voltage | VFD-BE Output Voltage | RCT Frequency | Freq of ESM Motors |
|---|---|---|---|---|
| 1. | 480 V, 60 Hz | 1500-2000 | 12 kHz | 0-600 Hz |
| 2. | 4160 V, 60 Hz | 2400 | 12 kHz | 0-600 Hz |
| 3. | 13,800 V, 60 Hz | 2400-3000 | 12 kHz | 0-600 Hz |

Figure 4:
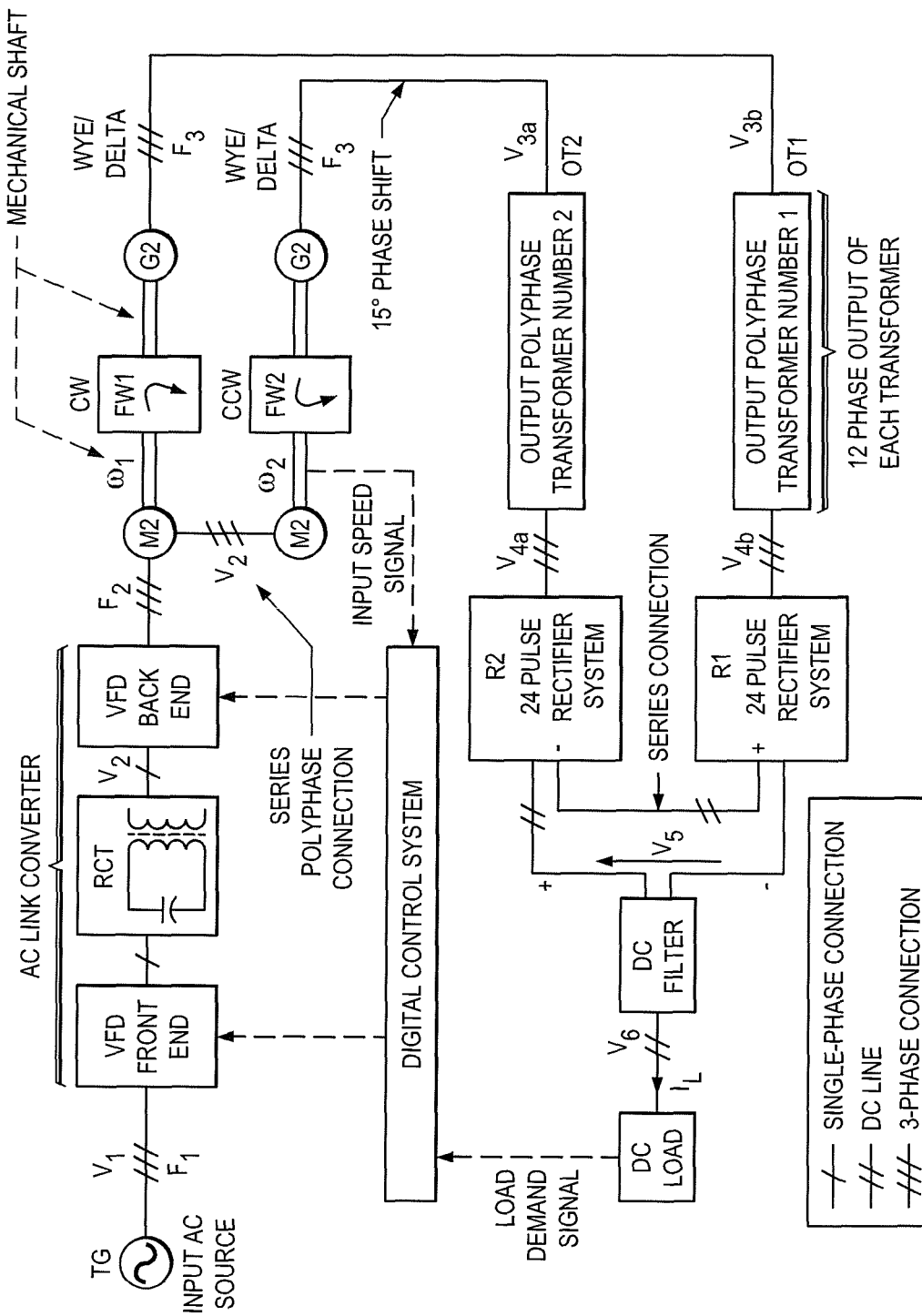
FIG. 4 illustrates a system of three power transformers (one single phase and two polyphase) offering maximum flexibility in choosing input voltages, output voltages and levels that maximize the electrical machinery magnetic design.

FIG. 4 shows a detailed electrical circuit for a transformer coupled AC link drive, having a transformer-coupled AC link drive for powering high power effectors with counter-rotating electrical machinery and series connection of high voltage step-up transformers followed by rectification and output filtering to a DC load.

The generators G1 and G2 are wound to suit output voltage levels according to specific loads. Each machine has a 6-phase output arranged as a delta-wye group forming a 12-pulse system for input to each corresponding rectifier R1 or R2. Overall, this is a 24-pulse rectifier system but clearly higher pulse numbers such as 48-pulse are available with higher phase generators. For a high voltage load, the following voltage distribution applies for loads such as pulse forming networks without the provision of an output transformer:

| Output DC Voltage | R1 or R2 Output | G1 or G2 Winding Output Voltage (line to line) |
|---|---|---|
| 10 kV | 5.0 kVdc | 1.85 kV AC rms |
| 25 kV | 12.5 kVDC | 4.625 kV AC rms |

This type of voltage level and distribution of voltage related stresses allows each generator G1 and G2 to operate at standard insulation level, such as 4.625 kVAC per machine, which is consistent with modern day insulating materials and practice. It is understood that a machine stator with a 4.625 kV rating will undergo certification for basic impulse level (BIL) at 20 kV and higher. Steady state output voltages beyond approximately 25 kVDC require the use of an output transformer, which is discussed herein and forms part of the system.

FIG. 4 differs from FIG. 3 by addition of the output transformers OT1 and OT2 which together constitute a 12-phase system at high frequency from synchronous generators G1 and G2. Each generator has an isolated wye and delta group at its output. Generator G1 is phase shifted from generator G2 by 15 degrees by its rotor design and therefore a system of n=24 vectors is created, each spaced at 15 degrees from the adjacent vector and allowing 24 pulse rectification with principal harmonics at 2n−1 and 2n+1, i.e. $47^{th}$ and $49^{th}$ harmonics. In a preferred embodiment, the output frequency F3 is higher than the motor input frequency F2 by at least a factor of two. This permits efficient power conversion and harmonics such as the $47^{th}$ are filtered with minimal apparatus weight and size. It is advantageous to keep generator stator voltages in the range of 2000-3000 VAC if compact, small diameter generator frames are desired. The output transformers permit two general cases of output voltages above and below the generator preferred operating voltage V3$a$ and V3$b$.

Example Case 1: High voltage output load=54 kVdc
V3$a$=V$_{3b}$=2.4 kVac line to line OT1, OT2 operate at 1200 Hz
V4$a$=V4$b$=20 kVac V5=2×27 kVdc
Example Case 2: Low voltage output load=1000 Vdc
V3$a$=V$_{3b}$=2.4 kVac line to line OT1, OT2 operate at 1200 Hz
V4$a$=V4$b$=373 Vac V5=2×500 Vdc FIG. 4 uses a system of three power transformers (one single phase and two polyphase) to offer maximum flexibility in choosing input voltages, output voltages and levels that maximize the electrical machinery magnetic design. A key feature is the ability of the RCT transformer to operate at a high frequency with advanced dielectric fluids and advanced magnetic materials. This design is valid for multi-megawatt output power as detailed and uses a hydro-fluoro-ether (HFE) insulating and cooling fluid internal to the main high voltage transformer. The higher the dielectric withstand properties of the insulating fluid are and the better the magnetic core material, the higher the power density which is a key objective of this disclosure. The HFE typically has a high dielectric constant e.g. k=6.4 which is advantageous and increases winding capacitance of the transformer. The significant electrical advantage of the design of this disclosure is the reduction in transformer leakage inductance at the higher frequencies, and this is afforded by use of the HFE fluid and reduction in the magnetic circuit path. The HFE transformer is described herein.

Hydro-Fluoro-Ether Transformer

The present disclosure makes use of an advanced non-flammable inert fluid known as hydro-fluoro-ether (HFE) and is also known as trade name Novec (trademark of the 3M Company) as the main dielectric fluid in the described high frequency, high power transformer for both the RCT link transformer and the final stage output polyphase transformers if used. A typical HFE fluid in commercial production is 3M Company "Novec 7300" which has chemical composition $C_6$—$F_{13}$—O—$CH_3$ with a boiling point of 98° C. Prior art high voltage transformers are typically wound and immersed in mineral oil or synthetic oil such as Midel 7131 both of which have the major disadvantage of being flammable and a low flash point. The HFE fluid is a non-flammable synthetic fluid with a 300° C. flash point, equivalent dielectric strength to conventional mineral oil and offers much higher thermal stability than conventional oils. Older dielectric fluids known as FC-72 or FC-77 are a fluorocarbon with some similar properties to the hydro-fluoro-ether but with more limitations. HFE fluids are presently used by the semiconductor industry and for cooling power electronic devices but to date have not been used as the main insulating and cooling fluid for a high voltage power transformer. The described disclosure covers the design and application of a multi-megawatt HFE insulated transformer unit which uses a combination of single-phase and two-phase fluid cooling.

The high dielectric strength of HFE at 40 kV/0.10 inch permits smaller high voltage clearance dimensions of transformer electrical circuits when immersed in HFE. Special features of certain Novec fluids such as 7300 and 7600 exhibit high dielectric permittivity of k=6.4 to 7.0 have additional benefits for high frequency since conventional transformer oils only have a dielectric permittivity of about k=3.2. The transformer core in a preferred embodiment is an amorphous metal core with low hysteresis losses and high magnetic permeability at frequencies in the range of 2 kHz to 30 kHz, the primary band of interest at these power levels. The combination of high magnetic permeability and high dielectric properties are two key attributes that permit construction of compact and dense power transformers.

In addition to the alternate commercially available fluoroketones and fluorinerts manufactured by 3M Company, the magnetic core material is a nano-crystalline tape-wound core that allows efficient operation at higher frequencies than the amorphous metal cores and lower heating dissipation at a particular high frequency of interest. Table 1 shows the wide range of Novec/HFE fluids that are applicable to the described power transformer showing high volume resistivity of 1E+11 to 1E+14 for several of the preferred fluids. Novec 649 is also a candidate fluid for transformer insulation due to its global warming potential of 1.0 and high volume resistivity of 1E+12.

The HFE fluid circulates among the various core magnetic structures and circulates among all windings of both primary and secondary transformer windings. The entire structure of the transformer is immersed in the HFE fluid and the vessel is sealed. The HFE fluid is chosen with a boiling point above the normal operating temperature of the hottest transformer winding but with a boiling point that allows a two-phase transition from liquid to gas if there is a transformer thermal overload. This is different from prior-art approaches that describe the fluoro-ketone fluids such as FC-72 or FC-77 which are typically in a constant two phase flow and a lower boiling point than the subject HFE fluid. For example, in this disclosure, the primary and secondary transformer windings are designed to have a maximum hot spot temperature of 100° C. and a boiling point of 130° C. is chosen for the particular HFE fluid. Therefore, the HFE fluid is in a liquid state until such time as there is a sustained thermal overload at which point a quantity of HFE boils and condenses inside the transformer vessel. This is an acceptable operating scenario for which the HFE fluid remains an excellent dielectric insulator even in the gaseous state.

The Table 2 shows candidate high performance magnetic materials of which the Metglas 2605S-2 is bested suited for

TABLE 1

| | | Fluoroketones | | | | | | | |
|---|---|---|---|---|---|---|---|---|---|
| | | Novec 7000 | Novec 7100 | Novec 7200 | Novec 7300 | Novec 7500 | Novec 7600 | L-21343 | Novec 649 |
| Boiling Point | ° C. | 34 | 61 | 76 | 98 | 128 | 131 | 167 | 49 |
| Pour Point | ° C. | −122 | −135 | −138 | −38 | −100 | −98 | −69 | −108 |
| Molecular Weight | g/mol | 200 | 250 | 264 | 350 | 414 | 346 | | 316 |
| Critical Temperature | ° C. | 165 | 195 | 210 | 243 | 261 | 260 | 282 | 169 |
| Critical Pressure | Mpa | 2.48 | 2.23 | 2.01 | 1.88 | 1.55 | 1.67 | 1.309 | 1.88 |
| Vapor Pressure | kPA | 65 | 27 | 16 | 5.9 | 2.1 | 0.96 | 0.133 | 40 |
| Vapor Pressure | psia | 9.4 | 3.9 | 2.3 | 0.9 | 0.3 | 0.1 | 0.0 | 5.8 |
| Heat of Vaporization | kJ/kg | 142 | 112 | 119 | 102 | 89 | 116 | 89 | 88 |
| Liquid Density | kg/m$^3$ | 1400 | 1510 | 1420 | 1660 | 1614 | 1540 | 1800 | 1600 |
| Coefficient of Expansion | 1/K | 0.002 | 0.002 | 0.002 | 0.001 | 0.001 | 0.001 | 0 | 0.002 |
| Kinematic Viscosity | cSt | 0.32 | 0.38 | 0.41 | 0.71 | 0.77 | 1.1 | 2.52 | 0.4 |
| Absolute Viscosity | cP | 0.45 | 0.58 | 0.58 | 1.18 | 1.24 | 1.65 | 4.54 | 0.64 |
| Specific Heat | J/kg-K | 1300 | 1183 | 1220 | 1140 | 1128 | 1319 | 1128 | 1103 |
| Thermal Conductivity | W/m-K | 0.075 | 0.069 | 0.068 | 0.063 | 0.065 | 0.071 | 0.065 | 0.059 |
| Surface Tension | mN/m | 12.4 | 13.6 | 13.6 | 15 | 16.2 | 17.7 | 19.0 | 10.8 |
| Dielectric Strength, 0.1" gap | kV | 40 | 40 | 40 | 40 | 40 | 40 | 32 | 40 |
| Dielectric Constant @ 1 kHz | | 7.4 | 7.4 | 7.3 | 6.1 | 5.8 | 6.4 | 5.0 | 1.8 |
| Volume Resistivity | Ohm-cm | 1E+08 | 1E+08 | 1E+08 | 1E+11 | 1E+08 | 1E+10 | 4E+14 | 1E+12 |
| Global Warming Potential | GWP | 420 | 297 | 59 | 210 | 100 | 700 | 250 | 1 |

| | | Fluorinerts | | | | | | |
|---|---|---|---|---|---|---|---|---|
| | | FC 3284 | FC 72 | FC 84 | FC 770 | FC 3283 | FC 40 | FC 43 |
| Boiling Point | ° C. | 50 | 56 | 80 | 95 | 128 | 155 | 174 |
| Pour Point | ° C. | −73 | −90 | −95 | −127 | −50 | −57 | −50 |
| Molecular Weight | g/mol | 299 | 338 | 388 | 399 | 521 | 650 | 670 |
| Critical Temperature | ° C. | 161 | 176 | 202 | 238 | 235 | 270 | 294 |
| Critical Pressure | Mpa | 1.94 | 1.83 | 1.75 | 2.47 | 1.22 | 1.18 | 1.13 |
| Vapor Pressure | kPA | 35 | 30 | 11 | 6.6 | 1.4 | 0.43 | 0.19 |
| Vapor Pressure | psia | 5.1 | 4.4 | 1.6 | 1.0 | 0.2 | 0.1 | 0.0 |
| Heat of Vaporization | kJ/kg | 105 | 88 | 90 | 86 | 78 | 68 | 70 |
| Liquid Density | kg/m$^3$ | 1710 | 1680 | 1730 | 1793 | 1820 | 1850 | 1860 |
| Coefficient of Expansion | 1/K | 0.002 | 0.002 | 0.002 | 0.002 | 0.001 | 0.001 | 0.001 |
| Kinematic Viscosity | cSt | 0.42 | 0.38 | 0.53 | 0.79 | 0.75 | 1.8 | 2.5 |
| Absolute Viscosity | cP | 0.71 | 0.64 | 0.91 | 1.4 | 1.4 | 3.4 | 4.7 |
| Specific Heat | J/kg-K | 1100 | 1100 | 1100 | 1038 | 1100 | 1100 | 1100 |
| Thermal Conductivity | W/m-K | 0.062 | 0.057 | 0.06 | 0.063 | 0.066 | 0.065 | 0.065 |
| Surface Tension | mN/m | 13 | 10 | 12 | 15 | 15 | 16 | 16 |
| Dielectric Strength, 0.1" gap | kV | >40 | >40 | >40 | >40 | >40 | >40 | >40 |
| Dielectric Constant @ 1 kHz | | 1.9 | 1.8 | 1.8 | 1.9 | 1.9 | 1.9 | 1.9 |
| Volume Resistivity | Ohm-cm | 1E+15 | 1E+15 | 1E+15 | 1E+15 | 1E+15 | 1E+15 | 1E+15 |
| Global Warming Potential | GWP | | 7400 | | | | | | the present disclosure with a saturation magnetic density Bs of 1.56 T, a maximum relative permeability of 193,397 at 60 Hz and a volume resistivity of 1.37 micro-ohm-m.

TABLE 2

| Material | Composition | $B_s$ (T) (60 Hz) | $\mu_{rmax}$ (60 Hz) | $\rho$ ($\mu\Omega \cdot m$) |
|---|---|---|---|---|
| FINEMET ® FT-3M F6045G | $Fe_{73.5}Cu_1Nb_3Si_{13.5}B_9$ | 0.90 | 185.000 (3.0 $A \cdot m^{-1}$) | 1.20 |
| NANOPERM ® M-033-03 N1 | $Fe_{73.5}Si_{15.5}Cu_1Nb_3B_7$ | 1.18 | 34.985 (1.8 $A \cdot m^{-1}$) | 1.15 |
| METGLAS ® 2605S-2 | $Fe_{78}Si_9B_{13}$ | 1.56 | 193.397 (4.3 $A \cdot m^{-1}$) | 1.37 |
| Silicon-iron GO E-004 | Fe—3.2%Si | 1.85 | 40.154 (23.0 $A \cdot m^{-1}$) | 0.47 |

Figure 5:
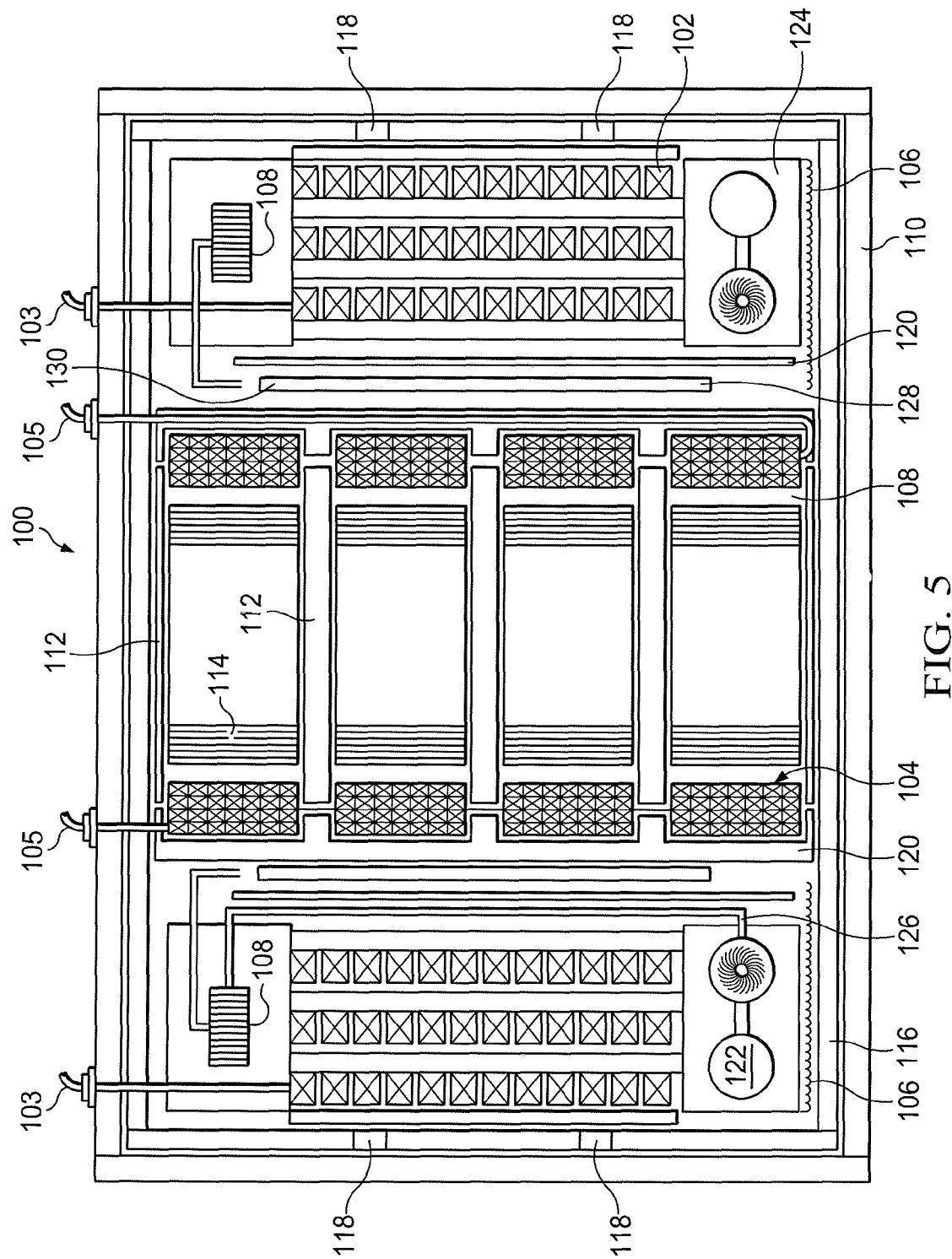
FIG. 5 shows a single-phase resonant high voltage transformer built with HFE insulating liquid phase and a provision for an internal HFE to water heat exchanger.

FIG. 5 shows a single-phase resonant high voltage transformer 100 built with HFE insulating liquid phase and a provision for an internal HFE to water heat exchanger. A Novec insulated transformer is shown with a segmented secondary core allowing two or greater secondary windings and a three layer primary core, showing a location of a Novec to water heat exchanger and four ferromagnetic inner cores.

Primary windings 102 have primary leads 103, and secondary windings 104 have secondary leads 105. Heat generated by the primary windings 102 and secondary windings 104 is transferred to the HFE fluid 106 which is circulated on a continuous basis and the HFE fluid 106, in turn, is circulated through a water heat exchanger 108 contained within the transformer vessel 110. Magnetic gap separation plates 112 are epoxy-fiberglass plates, such as Grade G-10, of which five are shown in FIG. 5. Magnetic core 114 is of the non-saturating type and is composed of four tape wound cores of metglas or similar high magnetic permeability material and ability to maintain a saturation flux density of at least 1.5 Tesla. Ferromagnetic return plates 116 on the lower, upper and sides of vessel 110 form the outer magnetic structure but also contain two or more non-magnetic concentric rings 118, possibly made of Nomex or G-10. The rings 118 provide a magnetic airgap in the outer magnetic structure which serves to limit saturation and provide for a more linear characteristic of voltage output versus magnetization ampere-turns. The ferromagnetic return plates 116 are ideally made of a laminated steel or amorphous metal structure, however, in a low flux transformer, the ferromagnetic return plates may be solid electrical steel. The outer containment structure 110 is aluminum or a highly conductive material, such as aluminum 6101-T64 grade, which surrounds the entire magnetic transformer structure and attenuates the axial and radial magnetic fields since the inner structure with multiple magnetic airgaps allows a minor amount of stray magnetic field. This outer containment structure 110 also keeps the segmented ferromagnetic plates 116 together structurally and has penetrations to permit lead and cooling tube access ports.

The winding design shown has concentric electric coils with multiple turns per winding which are segmented into zones, which allows free flow of HFE fluid 106 throughout all windings 102 and 104. A first level of insulation wrapping the conductive windings 102 and 104 is mylar, kapton or glass-mica tape. This tape insulation is then processed in what is known as vacuum pressure impregnation (VPI) which provides a dielectric coating, structural coating and impregnation on all conductors and nearby structural members. The primary vertical structural supports 120 are manufactured from Nomex 410 or similar high dielectric strength rigid material which form the main insulation and radial separation from the primary to secondary windings, while however, still allowing free flow of HFE fluid 106 around the vertical supports 120. An important aspect of this disclosure with HFE fluid circulation is the high dielectric isolation from the primary windings 102 to the secondary windings 104 which also allows high BIL or impulse voltage ratings according to ANSI/IEEE C57 standards.

FIG. 5 also shows a HFE, reservoir and pump 122 in a non-metallic pump housing 124 at the bottom of the transformer vessel to ensure forced flow of the HFE fluid 106 throughout the structure. HFE fluid transfer tubes 126 are configured to transfer the HFE fluid 106 to the heat exchanger 108. This layout does not show an inner conductive shield between the primary and secondary windings. This design advantageously limits the winding temperature rise to a level that does not boil the HFE fluid 106, and thus maintains the HFE fluid 106 in a single phase flow unless there is a thermal overload. In the event of a thermal overload, the HFE fluid 106 can be selected to boil at a temperature of e.g. 130° C. and enter into a two phase flow for which the latent heat of vaporization controls the rate of heat transfer. A clear advantage of this design is that the transition from a single phase flow to two phase flow is the maximum temperature at the windings will be capped at the boiling point of the HFE fluid 106 and this boiling point is well below the maximum operating temperature of the winding insulation materials, which are typically 180-220° C.

FIG. 5 also shows an electrostatic conductive shield 128 between the primary windings 102 and the secondary transformer windings 104 for the purpose of attenuating high frequency harmonic fields generated on either primary or secondary side. This shield 128 is composed of a fine mesh of a conductive material, such as copper or stainless steel, and is wound as a concentric screen with electrical continuity around the periphery except for one air gap to limit eddy circulation currents. The shield 128 acts to absorb higher harmonics and in so doing dissipates heat dependent on the flux magnitude linking primary to secondary windings. Shield 128 includes condensing fins 130 for the HFE vapor. Heat within the transformer structure is not advantageous and suitable means are provided to remove heat generated in four principal components: primary windings joule loss, secondary winding joule loss, shield joule loss, and magnetic core due to eddy current and hysteresis losses. One aspect of this disclosure is the provision of having the shield electrical (induced) currents operate at a higher current density and higher surface temperature than the main windings and allowing the HFE fluid 106 to boil at the conductive shield surface, but not to boil when in contact with either primary or secondary winding conductors. A preferred embodiment of this disclosure thus has provision for a mixed phase of HFE flow depending on the harmonic level of the waveforms entering either primary or secondary windings.

Figure 6:
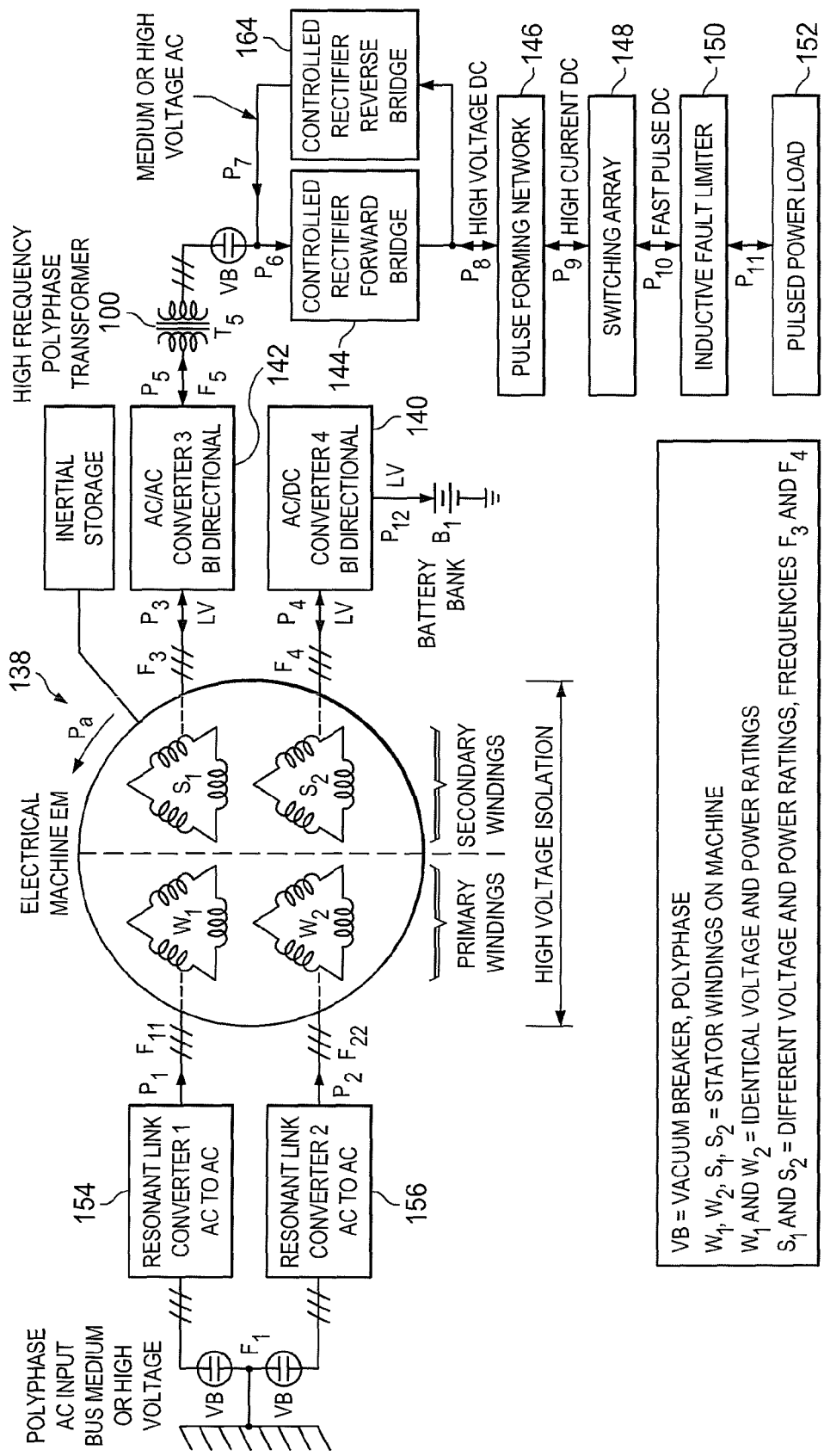
FIG. 6 shows a synchronous modulator system providing inertial storage and regulation of a secondary energy storage system and bidirectional energy transfer to the pulsed power load.

FIG. 6 shows a synchronous modulator system 138 providing inertial storage and regulation of a secondary energy storage system, such as battery bank B1 through converter 140 and secondary windings S2. The main machine output from winding S1 feeds converter 142, output frequency F5 can be higher or lower than F3, then is transformed in level by transformer T5, rectified by the controlled rectifier bridge 144 before the pulse forming network (PFN) module 146, switching array 148 and inductive fault limiter 150 prior to reaching pulsed power load 152. Transformer T5 is in a preferred embodiment the high voltage Novec insulated polyphase transformer 100.

Figure 7:
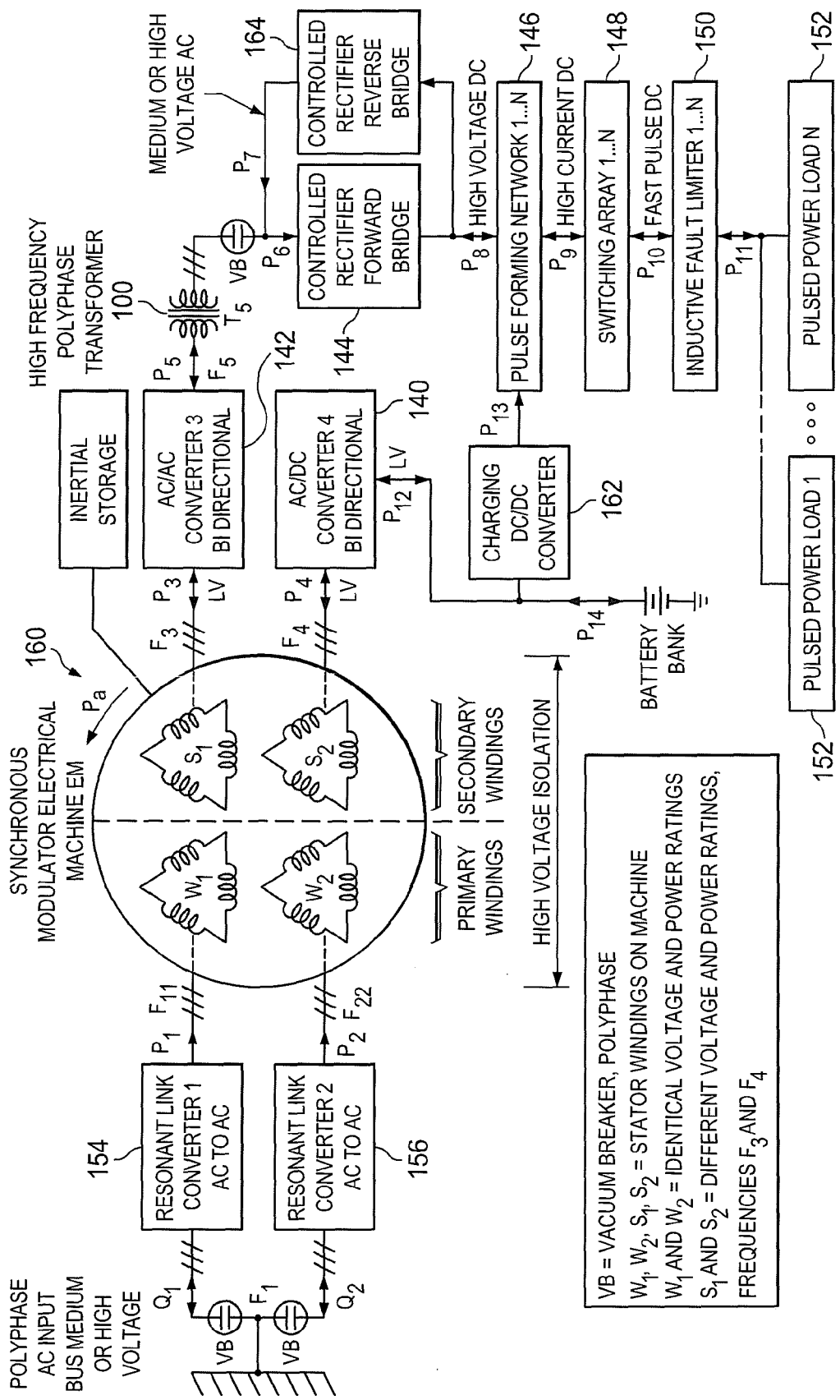
FIG. 7 shows a Hybrid Energy Storage System including inertial storage, synchronous modulator and Novec/HFE insulated high frequency step-up transformer.

FIG. 6 shows the single electrical phase secondary winding assembly 138 split into two sub-windings S1 and S2 feeding separate output rectifiers 144 and 164 or separate output loads which are further shown in a system diagram in FIG. 7. The HFE fluid provides high dielectric isolation, such as 40 kV/mil, between S1 and S2 for both steady state and impulse duty. The magnetic coupling of either S1 or S2 to the primary winding is identical and this ensures equal voltage outputs of the two windings S1 and S2 under most load conditions. In a preferred embodiment, the secondary winding may have more turns than the primary winding, however, it should be apparent to one skilled in the art that structures with the primary winding having greater turns than the secondary winding are equally valid and make equally good use of the HFE fluid properties.

FIG. 6 shows an example of where the Novec insulated high voltage transformer 100 can be applied in a pulsed power system capable of providing high rep-rate high voltage pulsed power through use of the EM in conjunction with the battery bank B1 that may or may not be the primary storage apparatus. Power Converters 154 and 156 are resonant link bi-directional power converters using, in a preferred embodiment, thyristor switches; these have input or line frequency F1 and output frequency F11 and F22 respectively. Ideally, F11 and F22 are higher in frequency than F1 and provide for high efficiency conversion and compact output filtering. Converters 154 and 156 have internal circuitry to adjust an input power factor to be unity under all normal load conditions. In the baseline case, power outputs P1 and P2 are identical and are commanded in magnitude according to how fast the system controller decides to charge the electrical machine and ramp speed up or down of the inertial storage.

Vacuum breakers VB are included to isolate each converter 154 and 156 in the event of failure or maintenance and are not essential to the basic principle of operation. When the input supply is powering the machine in the startup mode, all of the input energy Es is transferred to the machine accelerating power "Pa" and when this is happening, the output frequencies F3 and F4 are in a constant state of change and increasing from zero to maximum frequencies F3m and F4m. Machine winding S1 provides a path to AC/AC converter 142, and machine winding S2 provides a path to charge the battery bank B1 through AC/DC converter 140 which can accept variable frequency input power at F4 and convert this to regulated DC output as P12, which is typically a lower voltage and directly applied to the battery bank B1. However, the charging rate to the battery bank B1 must be limited to prevent battery overheating and potential cell failure; this charging rate may be, for example, one-tenth (C/10) of the charging rate of the inertial storage. The EM performs the functions of a battery charging regulator and absorbs/limits regenerated energy from the load circuit 146, 148, 150, 152 to avoid overcharging the battery when the load energy storage bank must be unloaded in the event of an aborted mission.

FIG. 7 shows a Hybrid Energy Storage System 160 including inertial storage, synchronous modulator and Novec/HFE insulated high voltage step-up transformer 100 (T5) with an ability to distribute (through a separate path from FIG. 6) energy directly from the battery storage bank B1 to directly charge the PFN modules 146 through a charging DC/DC converter 162. In this scheme the battery B1 provides a constant-current charging cycle followed by a constant-power higher voltage charging cycle provided through the HFE transformer 100 and forward rectifier bridge 164, both cycles being necessary to attain rapid charging of the PFN modules 146 in minimal time. Therefore, the additional battery mode operates from unit 162 through P13, unit 146, power P8, unit 164, power P7, unit 100, power P5, unit 142, and power P3. Transformer 100 may contain a nano-crystalline magnetic core to enhance operation at high frequency with minimum weight.

Figure 8:
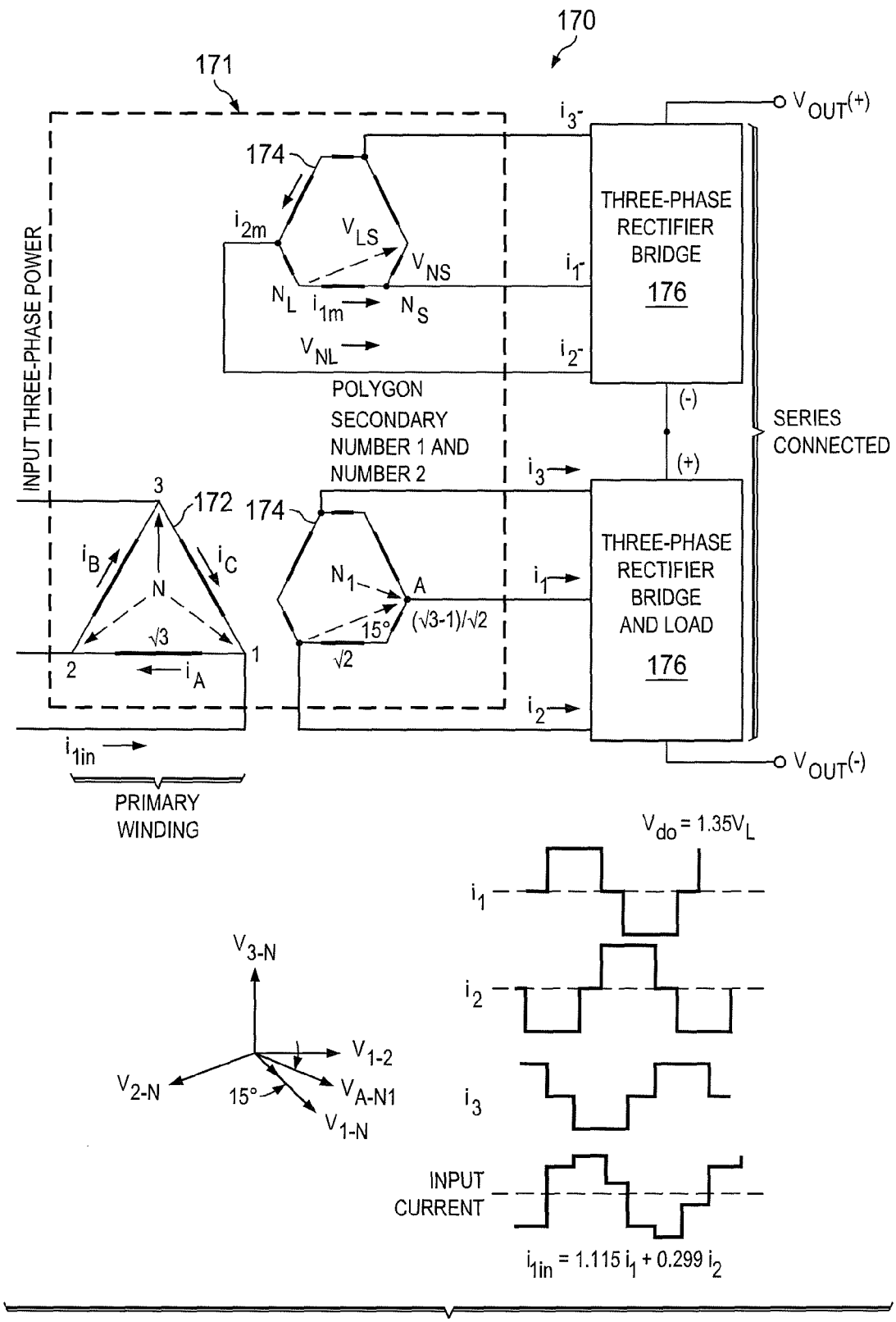
FIG. 8 shows a preferred embodiment for a high power Novec/HFE transformer arranged as one primary winding in a conventional delta and two secondary windings connected in a double polygon arrangement.

FIG. 8 shows a preferred embodiment for a high power Novec/HFE system 170 having a transformer 171 arranged as one primary winding 172 in a conventional delta and two secondary windings 174 connected in a double polygon arrangement of six individual winding groups per secondary winding 174, and 3-phase outputs of each polygon arrangement of secondary windings 174 are first rectified by two 6 pulse bridge rectifiers 176 connected in series to form a complete high voltage DC power supply. The rectifiers 176 can be either diode or phase controlled devices such as thyristors or insulated-gate bipolar transistors (IGBTs). The 15 degree phase shift introduced by the polygon arrangement of two identical rated units operated on a common primary core and primary winding results in a very low input harmonic current content that is superior to conventional delta-wye 12 pulse circuits. The HFE insulated transformer 171 is unique is that reactances of the polygon secondary windings 174 can be designed lower than conventional units and consequently the regulation of this system 170 is superior to prior art. In a preferred embodiment the polygon secondary has two types of winding groups; the high impedance or main windings has more turns than the "shifter" winding in the ratio of 1.414 to 0.517 which is 2.735:1

Both the upper and lower polygon windings 174 have identical turns but differ where the polygon is tapped for output as shown in FIG. 8. The input current is Ia=1.115 $I_1$+0.299 $I_2$ where $I_1$ and $I_2$ are the output to two phases of the three phase rectifier. Harmonic filtering on the line side of this polygon arrangement is lower in weight and volume than conventional wye-delta output schemes.

Energy Storage System Without Electro-Chemical Battery Storage

Figure 9:
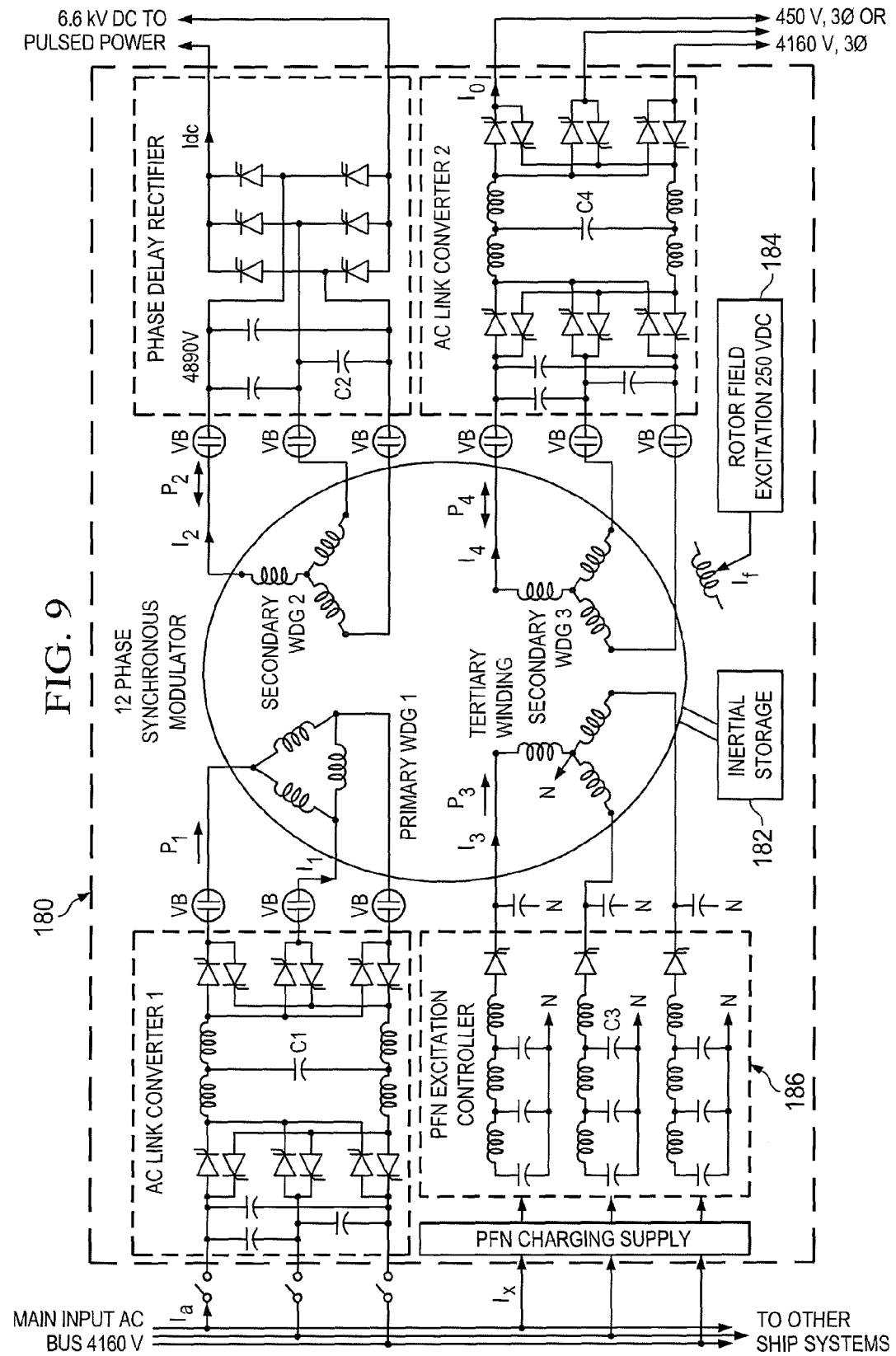
FIG. 9 shows a layout of a 12-phase bi-directional synchronous or induction electrical machine used as a comprehensive energy storage unit and galvanic isolator.

FIG. 9 shows a layout of a 12-phase synchronous modulator/flywheel storage device 180 with 3 phases for input power (winding 1), 3 output phases for rectification to high voltage pulsed power system (winding 2), 3 phases output to conventional medium voltage (4160 Volt) pulsed loads (winding 3) such as radar system and 3 phases input from a pulsed excitation system to stator tertiary excitation winding which allows for very fast ramp rates for output power.

FIG. 9 shows a layout of a 12-phase bi-directional synchronous or induction electrical machine used as a comprehensive energy storage unit and galvanic isolator for a system with medium voltage AC input and a need for high voltage AC or DC output. The AC input may be medium voltage 3-phase, such as 4160 Volts or 13.8 kV, at either line frequency 60 Hz or a higher frequency such as 240 Hz. The AC output is, in a preferred embodiment, at a high voltage such as 22 kV rms to allow charging of a PFN or similar apparatus which may require high voltage DC at a level of 30 kV or higher. Winding 2 in FIG. 9 shows a 4890 V rms 3-phase output which is rectified to 6.6 kVDC and output current labeled $I_{DC}$. The storage device 180 has 100% regeneration of electric energy from the load back to the source by use of multiple AC link power converters on the input and multiple and similar AC power converters on the output. The storage device 180 may be considered electrically symmetrical about the centerline of the electrical machine. The AC link output converters provide sinusoidal voltage and current from each machine delta-connected output winding, and in doing so minimize harmonic fields in the electrical machine and also yield excellent power quality to the load.

There are several reasons for dividing the machine input and output windings into n-multiple 3-phase groups, first of which is redundancy if one group should fail, the remaining n−1 groups can perform substantial system functions. Second, the use of multiple input and output converters allows for phase offset of each AC input or output current and therefore harmonic quality is improved. Electrical machines constructed in accordance with FIG. 9 can have high galvanic isolation on the order of 75 kV from input to output side which is necessary when protection of the main power system from high energy transients caused by the PFN load are possible. The input motoring windings are shown in FIG. 7 connected in parallel delta through variable frequency AC link converters acting as motor drives and the two machine output or generating windings are also shown in parallel delta connected through separate AC link converters feeding a different DC bus. Clearly this arrangement is bidirectional for AC link converters 1 and 2 can be used for regeneration (machine deceleration mode or recovery of PFN energy) into the incoming line and AC link converters 3 & 4 can be used to absorb multiple types of load energy and return this to the synchronous machine.

The electrical machine in FIG. 9 has an integral or external inertial storage device 182 attached that allows the machine to "ride through" input supply line interruptions and also this allows the machine to completely decouple itself from the line during a high energy burst of the PFN. It is this latter function that is a preferred embodiment. The input converter is used to bring the electrical machine up to 100% speed and during discharge from 100% speed to 70% speed, the input converters are preferably turned OFF and energy is strictly supplied by the machine inertia. The electrical machine is specially designed to have a low sub-transient and low transient reactance so as to yield a higher energy fast pulse at its output windings. Irrespective of the stator voltage level, the machine output reactances can be low. For example, with a 22 kV output the sub-transient reactance can be 4.5% and the transient reactance can be 12%. For a 5 MVA rated machine output at 22 kV rms line to line, the peak output current will be 2916 Amps rms and the short circuit apparent power will be 111 MVA. With a typical totally-offset output wave, the peak current will be 4811 Amps. The load PFN, even with DC rectification, will have high frequency harmonics at about 30 kHz which will impinge on the machine output windings but with the scheme shown in FIG. 9, these high frequency transients will not adversely affect the primary windings due the machine galvanic and magnetic isolation.

The layout of the 12-phase synchronous modulator/inertial storage device with a dual mode excitation shown at 180 provides normal excitation from unit 184 (rotor field 250 VDC circuit or "steady DC excitation") for slowly changing loads (such as normal ship service loads, HVAC and compressors) and a fast excitation circuit from unit 186 (such as railgun, radar or laser weapon loads) which is accomplished by a tertiary stator winding. The input 3-phase power is applied to winding No. 1 from a conventional AC distribution bus or turbine generator, winding No. 2 has 3 output phases for rectification to high voltage pulsed power system, winding No. 3 has 3-phase output to conventional medium voltage (e.g. 4160 Volt) pulsed loads such as radar system and winding No. 4 has a 3 stage input from a high rate of rise pulsed-DC excitation system 186 to the stator tertiary excitation winding which creates fast ramp rates for output power. The pulsed DC and steady state DC excitation modes are not to be used simultaneously and they have widely different time constants, which can differ by design by a factor of two orders of magnitude. It is clear that all 4 stator windings are built on a common stator magnetic core although, in the most general case, each has a different applied or generated voltage, different current levels and different time constants. FIG. 9 constitutes an excitation scheme for a multi-purpose synchronous modulator IES which can accommodate both slow and fast changing load energy requirements.

Figure 10:
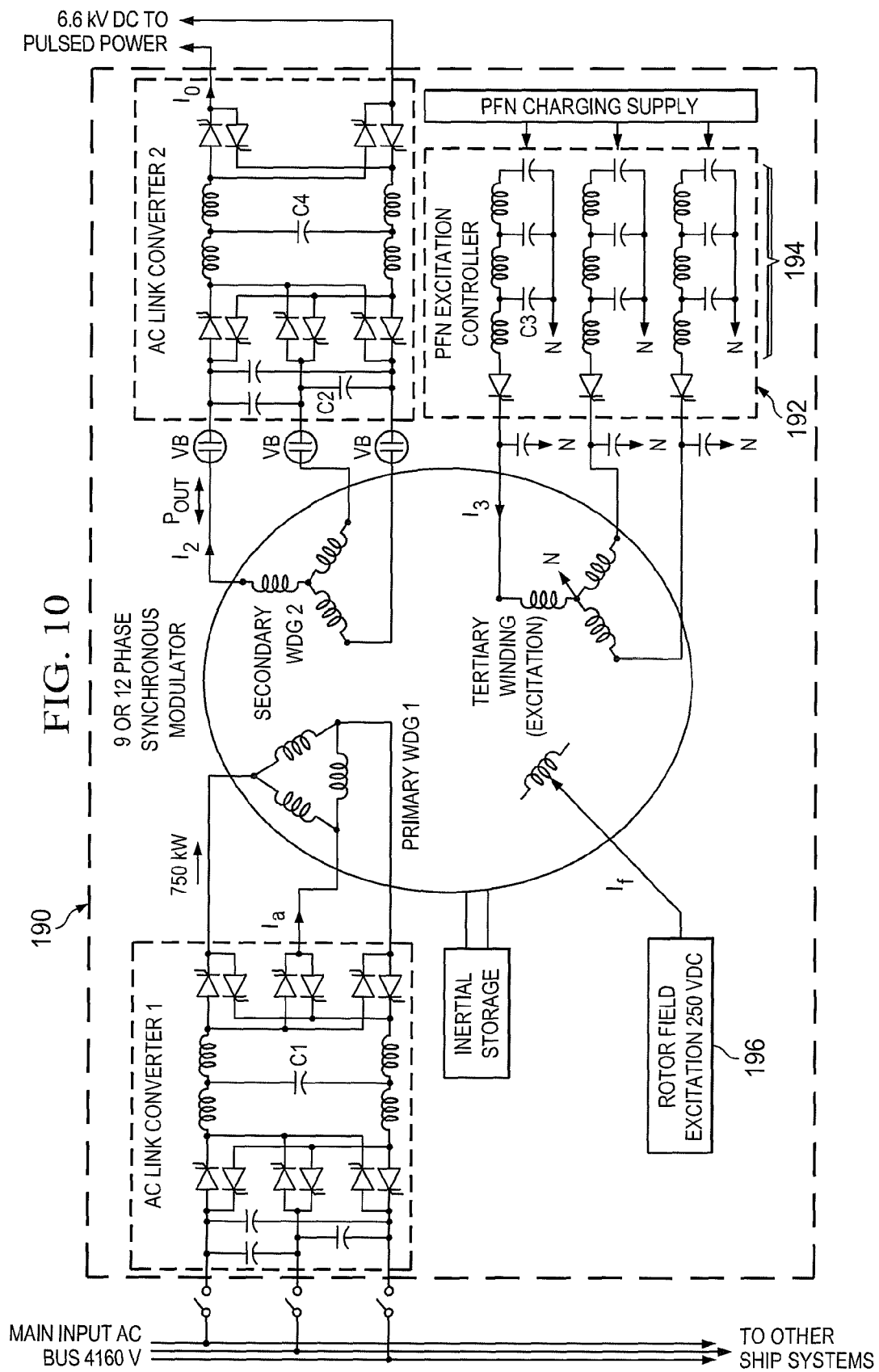
FIG. 10 shows a layout of a 9-phase synchronous modulator/flywheel storage device with 3-phase input power, one output 3-phase winding for high voltage pulsed power loads, and 3 phase input from a pulsed DC excitation to stator tertiary winding in addition to conventional rotor field excitation to allow for fast ramp rates for output power.

FIG. 10 shows a layout of a 9-phase synchronous modulator/flywheel storage device at 190 with 3-phase input power from AC link converter 1, one output 3-phase winding for high voltage pulsed power loads, and 3-phase input from a pulsed DC excitation 194 to stator tertiary winding in addition to conventional rotor field excitation from 196 to allow for fast and slow ramp rates for output power, respectively.

It is important that this arrangement uses a traveling wave excitation of the electrical machine (injection into the stator) whereby the three tertiary input currents $I_3$ from 192 are driven by a capacitive discharge pulse forming network (PFN) 194 which has ability to slew current at very fast rates in comparison to conventional DC excitation schemes in present use today with slow time-constant rotor fields. This disclosure adds a high voltage step-up transformer to the output of AC link Converter 2 or similar frequency converter. FIG. 10 shows a circuit suitable for 6.6 kVDC output voltage and it is apparent to one skilled in the art that the converter 2 output can be transformed from a output level of 4160 Volts AC to 75 kV whereby rectification would yield 100 kVDC to be delivered to the load circuit. This circuit of FIG. 10 enables the system response time on the order of 1.0 to 10 micro-seconds.

Figure 11:
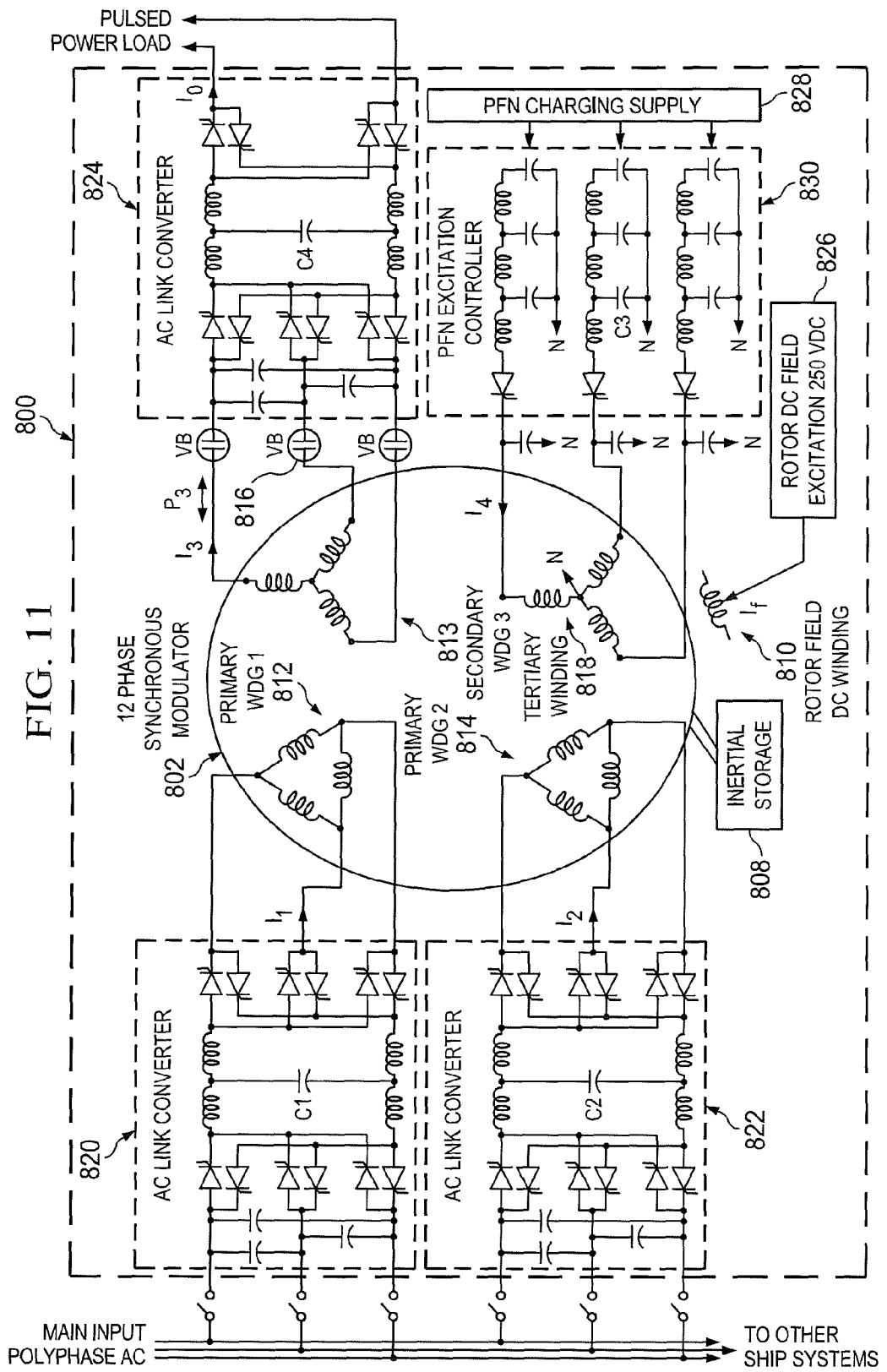
FIG. 11 shows the layout of a 12-phase synchronous modulator/inertial storage device with two 3-phase input power motoring or regenerating windings, one 3-phase output for high voltage pulsed power loads, and a 3-phase input from a pulsed DC excitation to a stator tertiary winding in addition to conventional rotor field DC excitation to allow for fast ramp-rates for output power.

FIG. 11 shows the layout at 800 of a 12-phase synchronous modulator/inertial storage device 802 having inertial storage 808 with two 3-phase input power motoring or regenerating windings 812 and 814, one 3-phase stator secondary winding output 813 with vacuum breakers 816 for high voltage pulsed power loads, and a 3-phase input from a pulsed DC excitation controller 830 to a stator tertiary winding 818 in addition to conventional rotor field DC excitation 826 via a rotor field winding 810 to allow for fast ramp-rates for output power. Both AC link converter 820 and 822 are bi-directional in power and energy flow and allow the output power to be generated at a higher frequency than the input frequency prior to rectification for feeding pulse forming networks or DC loads. The higher frequency enhances the synchronous modulator (SM) 802 and power conditioning power density. The PFN excitation controller 830 for the tertiary winding 818 is novel and each of three excitation phases has a 3 stage L-C PFN which creates a system of fast AC pulses in output current I3 which are spaced 120 degrees apart when applied to the electrical machine. A thyristor or similar solid state switch is included in each PFN excitation circuit to control the timing of each PFN circuit in relation to the next and act as an isolator switch. Note that although the PFN is charged with a DC supply 828, the PFN circuit in conjunction with the machine winding inductance is a resonant circuit and the output pulses are alternating in polarity, typically with an exponentially decreasing amplitude, and thus constitutes a traveling wave of excitation magneto-motive force (MMF). In the most general case, there are "n" stages of PFN excitation circuits and the output pulses are spaced 360/n degrees apart in phase. A system such as shown in FIG. 11 can have a rise time of 50 microseconds or less and cause the machine overall MMF to increase to full strength in less than 1 millisecond, which is an order of magnitude faster than conventional rotor DC excitation. This method of quickly ramping the rotating machine's excitation further advances the synchronous modulator ahead of a singular battery bank for high energy pulse regulation due to the need for fast energy regulation and recovery with power slew rates such as 20 MW/s.

Figure 12:
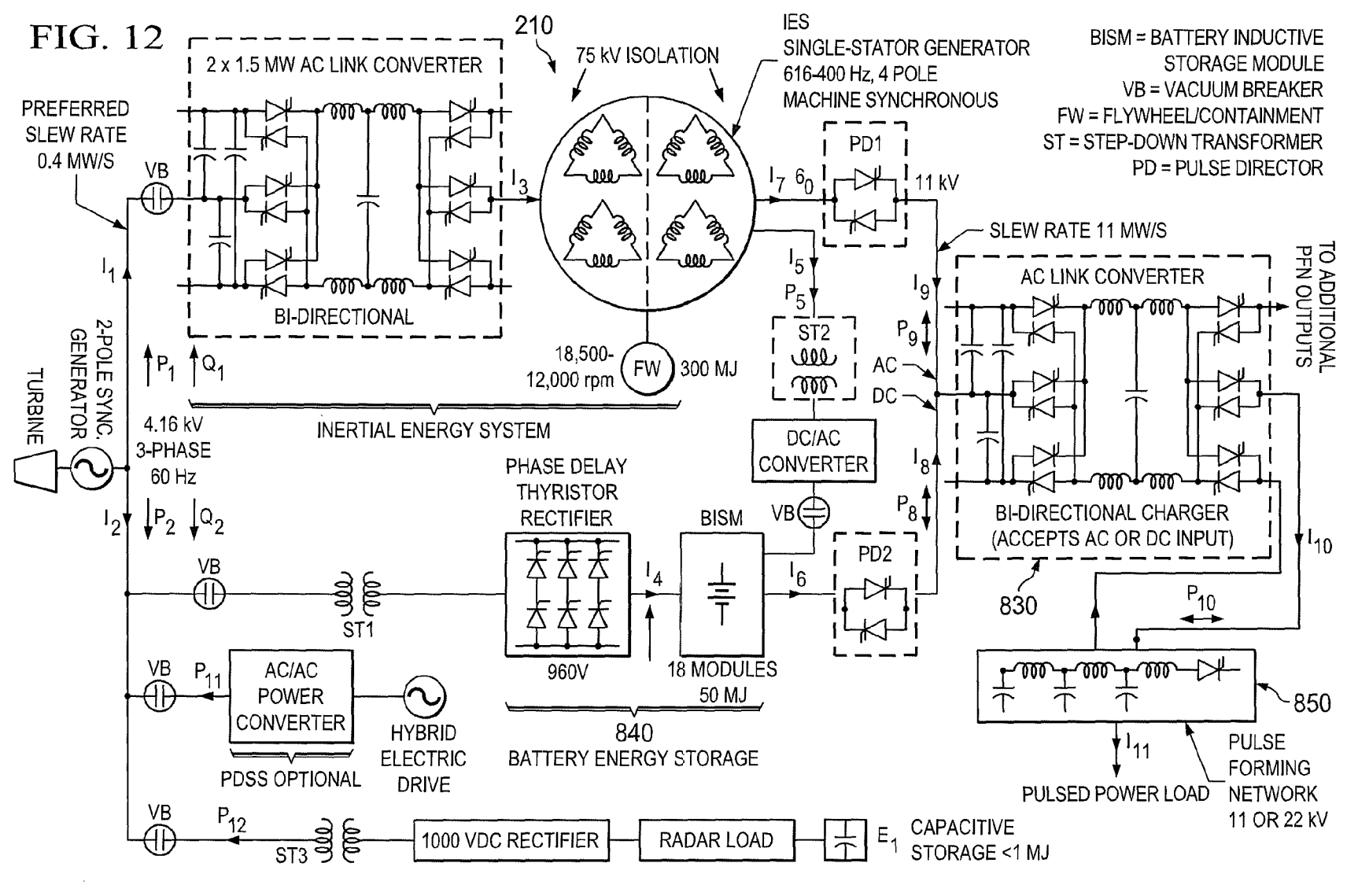

FIG. 12 shows a hybrid energy storage system (HESS) at 210 as applied to a ship with a synchronous modulator/inertial energy storage, battery energy storage, or hybrid electric drive with slowly fluctuating load and a conventional pulsed load such as radar. There is 75 kV BIL isolation between the pulsed load and the ship power system through both the synchronous modulator and the battery circuit step down transformers ST1 and ST2.

It should be clear that the battery inductive storage module (BISM) in FIG. 12 can be replaced by a similar energy storage device of an ultra-capacitor which is inherently a low voltage device composed of series strings of cells. In large systems design the fact that there are certain limitations to how many ultra-capacitors can be safely wired in series, it is imperative that the described overall system make technical allowances for devices which are inherently higher voltage such as the rotating machinery and devices which are inherently lower voltage. Hence, the use of the transformers ST1 and ST2 are also necessary for the synchronous modulator in controlling the current and power flow to the ultra-capacitor. The ultra-capacitor is best used in a constant current mode and the electrical machinery is best utilized in a constant power mode. Transformers ST1 and ST2 can both be Novec insulated/Novec cooled to reduce overall volume of plant. Transformer ST2 is intended in a preferred embodiment to be a medium frequency transformer since the DC/AC converter from ultra-capacitor output circuit is most profitably a medium frequency converter and the electrical machine can accept medium frequency such as 400-616 Hz as shown in FIG. 12. In FIG. 12, the output of the DC/AC converter is synchronized and regulated to correspond to the frequency range of the synchronous modulator at differing shaft speeds.

The HESS 210 comprises 4 main power converters, three of which are bi-directional for the AC link converters and one hybrid electric drive converter. The one uni-directional converter is the thyristor phase delay rectifier (PDR) which converts main distribution bus voltage to a regulated battery level voltage through a step down transformer ST1 and serves as the battery charging circuit. It is a further embodiment of this disclosure that the HESS can absorb regenerated energy that is developed by the hybrid electric drive in a braking mode (thru the P11 path) and which cannot be safely returned to the turbine generators, but instead, this energy is directed to the inertial storage system through the P1 path via the main distribution bus.

Components PD1 and PD2 are solid-state pulse directors that segregate the synchronous modulator output mode (constant power through I9 path) from the battery output mode (constant current through I8). The power path P5 is for energy interchange between the synchronous modulator and the battery bank; this is bidirectional and can include a polyphase step-down transformer and associated AC/DC converter since the I5 current output is usually a higher voltage level than the battery bank. The final stage AC link converter 830 which produces output current I10 has the ability to accept either AC or DC input, from an internal resonant circuit and output high voltage DC to the PFN as power P10.

Further, the BISM output power P8 and current I8 can be processed by the AC link inverter system into the I10 and P10 path so as to charge the main pulse forming network for the pulsed power load at current I11. Path P8 provides a bi-directional power flow between the pulsed load PFN bank or the synchronous modulator and the battery energy storage system to either charge the battery or discharge the battery at controllable rates (e.g. 4 C) which do not exceed the manufacturer's specification for cycling or power dissipation. In a preferred embodiment, excess PFN charge is first sent back to the inertial storage unit at an aggressive rate, such as 20 MW/s, a resting period is specified and then a portion of this inertial kinetic energy is parceled out to the battery bank at a lower rate such as 2 MW/s to be stored in an electrochemical system. This provides higher reliability, reduces the chance of catastrophic failure and extends the battery lifetime. The action of the synchronous modulator is to buffer the secondary energy storage device (BISM) and to utilize its high capability in basic energy density (kW-sec/$m^3$) while limiting battery temperature cycling, peak power draw and regenerative capability since its power density (kW/$m^3$) is lower than the inertial storage device.

There is 75 kV electrical isolation between the pulsed load, which can generate very high surge voltages, and the ship power system through both the synchronous modulator stator winding isolation and the battery circuit step-down transformers ST1 and ST2. Thus, the use of a multi winding electrical machine provides high galvanic isolation of the power system from load generated transients electrical waveforms and further reduces the torque pulsations on the input source turbine generator by use of the IES stored energy for powering large load swings in power demand.

Figure 13:
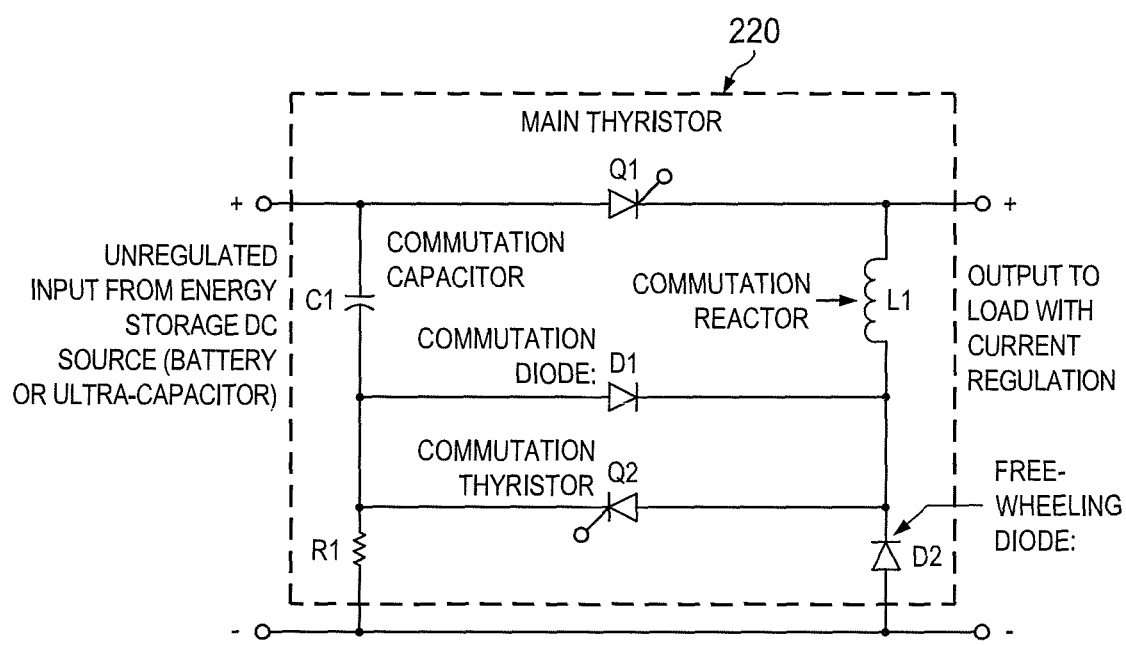
FIG. 13 illustrates a detailed circuit comprising a DC to DC power converter/chopper for accepting unregulated DC source power from a battery or ultra-capacitor and converting to regulated current and power output for delivery to load or intermediate storage device.

FIG. 13 illustrates a detailed circuit 220 comprising a DC to DC power converter/chopper for accepting unregulated DC source power from a battery or ultra-capacitor and converting to regulated current and power output for delivery to a load or an intermediate storage device.

There is a variation of HESS 210 whereby the DC energy storage from either the battery storage bank or ultra-capacitor bank may be required to directly feed a DC pulsed load and avoid transformation to AC. FIG. 13 shows a detailed circuit of DC to DC pulsed-power converter/chopper at 220 for accepting unregulated DC source power from a battery or ultra-capacitor source and converting to regulated current and power output for delivery to a DC load or an intermediate storage device. The main switching element is thyristor Q1 which may be configured as multiple devices in series or in parallel to suit system requirements. The commutating switching element is thyristor Q2 and commutation diode D1 which may be configured as multiple devices in series or in parallel to suit system requirements. Diode D2 is a freewheeling power diode and necessary if the load is inductive. A preferred embodiment uses thyristors rather than IGBTs due to the higher power and current levels attained by the thyristor technology. In smaller applications, it is acceptable to use IGBT switching devices for elements Q1 and Q2. The circuit 220 does not have galvanic isolation of input to output but does offer a highly compact mega-watt rated power converter with fast response times. The circuit 220 can use conventional fast thyristors or gate turn off thyristors which offer extra safety feature in the event the commutation circuit has a component failure. A suitable commercially available Gate Turn Off (GTO) thyristor for this high voltage DC converter is ABB Device No. 5SGA-40L4501 which has a 4500 Volt rating at 1000 Amps continuous and 26 kA surge current for a 8.3 ms wide pulse.

Figure 14:
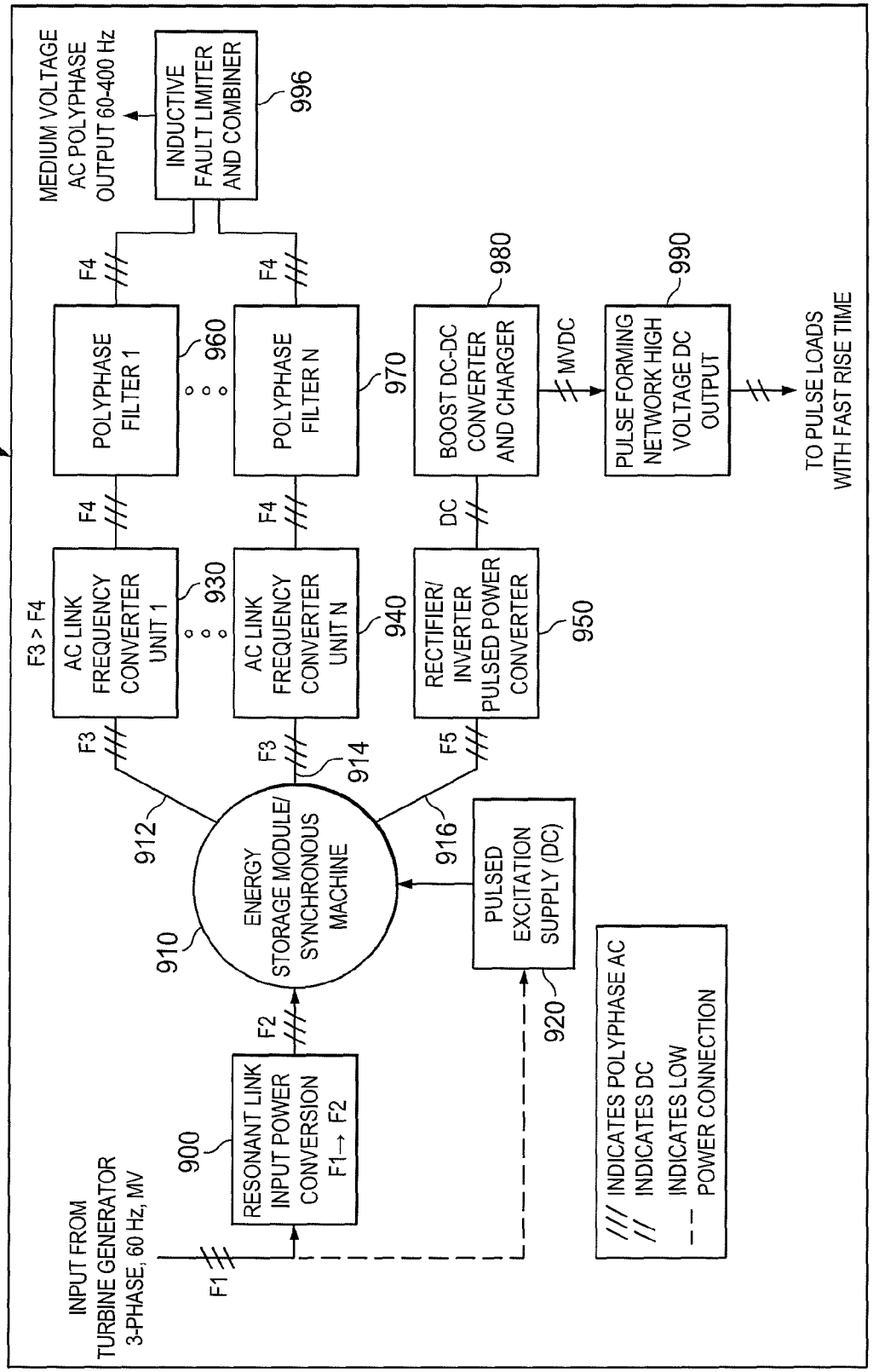
FIG. 14 shows a system layout of a generalized synchronous machine with inertial storage, a pulsed excitation supply, and three output ports two of which are used for medium voltage AC output and the third output is rectified, boosted in level and operates a pulse forming network for a fast rise time electromagnetic effector load.

FIG. 14 shows a system layout at 230 of a generalized synchronous machine with inertial storage 910, a pulsed excitation supply 920, and three output ports 912, 914, 916 two of which are used for medium voltage AC output and the third output is rectified, boosted in level and operates a pulse forming network 990 for a fast rise time electromagnetic effector load. Multiple frequency converter units 930, 940 are provided that change the machine variable frequency F3 to a constant frequency F4 which are filtered by units 960, 970 and then directed to an inductive fault limiter and combiner 996 with a medium voltage polyphase output to the AC load. The details of the synchronous modulator unit are shown in FIG. 7. The pulsed DC excitation supply is a novel feature that does not exist in state of the art machines and provides a means to excite the synchronous modulator to produce fast output pulses independent of the power system or machine speed. The particular stator winding to utilize this pulsed DC excitation can be a 3-phase, 6-phase or higher "AC" winding with low internal inductance, and spaced uniformly around the periphery of the synchronous modulator stator core so as to magnetize each machine pole with a high slew rate pulsed MMF. The pulsed excitation supply can consist of a series of energy storage capacitors charged to a DC level, but on discharge generate an AC multi-phase waveform that is phased in time to constitute a rotating system of current vectors and a consequent rotating magnetic field.

System layout 230 also allows the electrical machine to operate at a higher input frequency F2 than line frequency F1 by use of the input power converter 900. This has specific benefit in that the energy density of the rotating machine, for a fixed number of poles, is directly proportional to the input frequency. The output power can be obtained at two distinct and different output frequencies F3 and F5 which are generally higher than the machine input frequency F2 which, as a minimum, provides for very efficient voltage step-up transformation. Output inversion produces either a lower or higher frequency than the machine output frequency depending on applications. For very high power applications where a thyristor cyclo-converter is desired, the machine output frequency can be high such as 360 Hz and the converter output can be 60 Hz for operating a main power bus or a higher frequency such as 120 Hz that will feed an AC/DC rectifier system. This has advantage in compact DC filtering by use of frequencies higher than 60 Hz for rectifier inputs. There is also high impulse voltage isolation from input to output of this machine and this feature avoids ground loops or ground faults typical of conventional systems.

Figure 15:
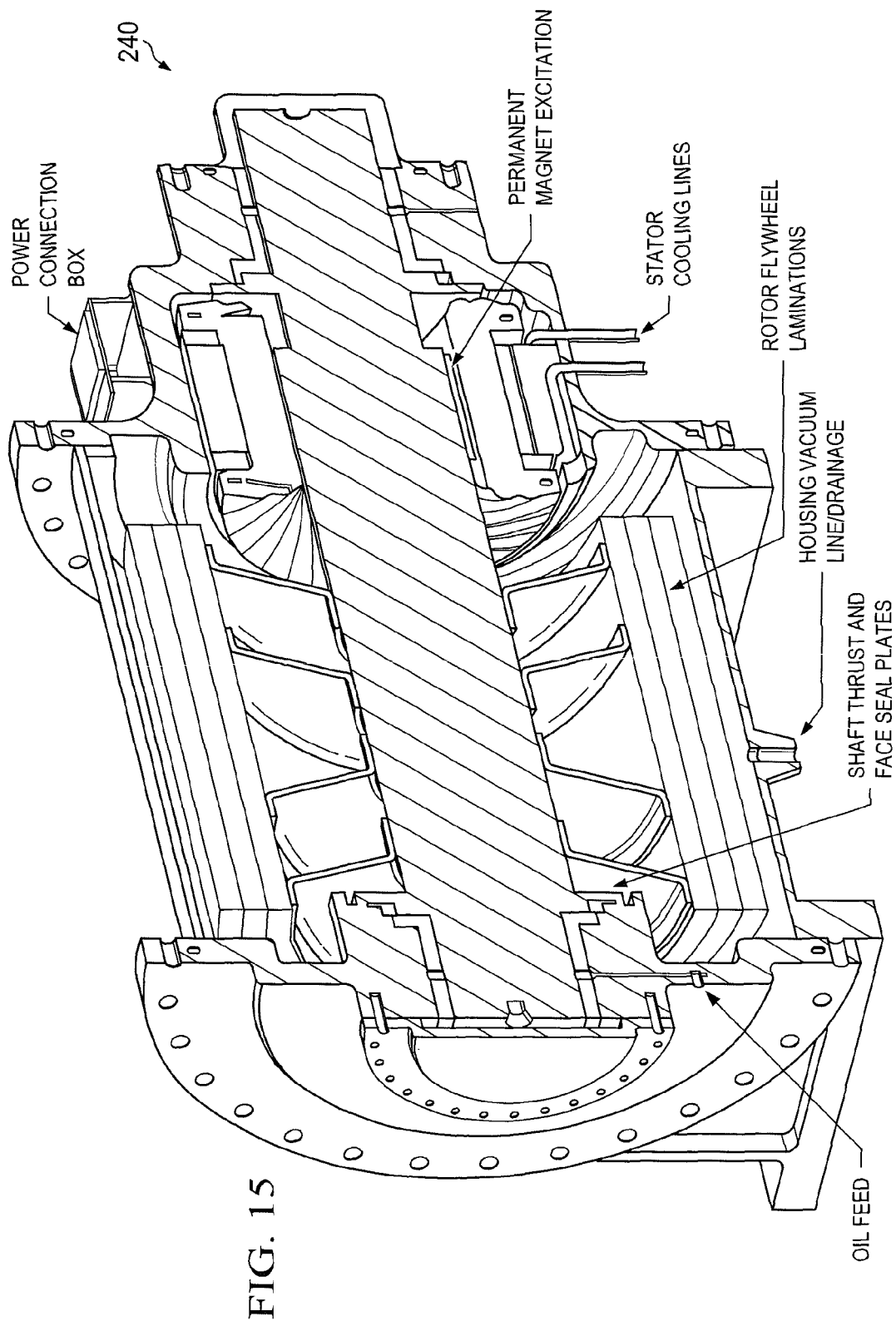
FIG. 15 shows a 3D view of synchronous modulator electrical machine combined with a high speed inertial storage device using composite flywheel in a common frame with direct liquid cooled stator windings on the electrical machine.

FIG. 15 shows a 3D view of synchronous modulator electrical machine at 240 combined with a high speed inertial storage device using composite flywheel in a common frame with direct liquid cooled stator windings on the electrical machine. This unit has a vacuum enclosed flywheel and electrical rotor which is a permanent magnet type, as shown.

Figure 16:
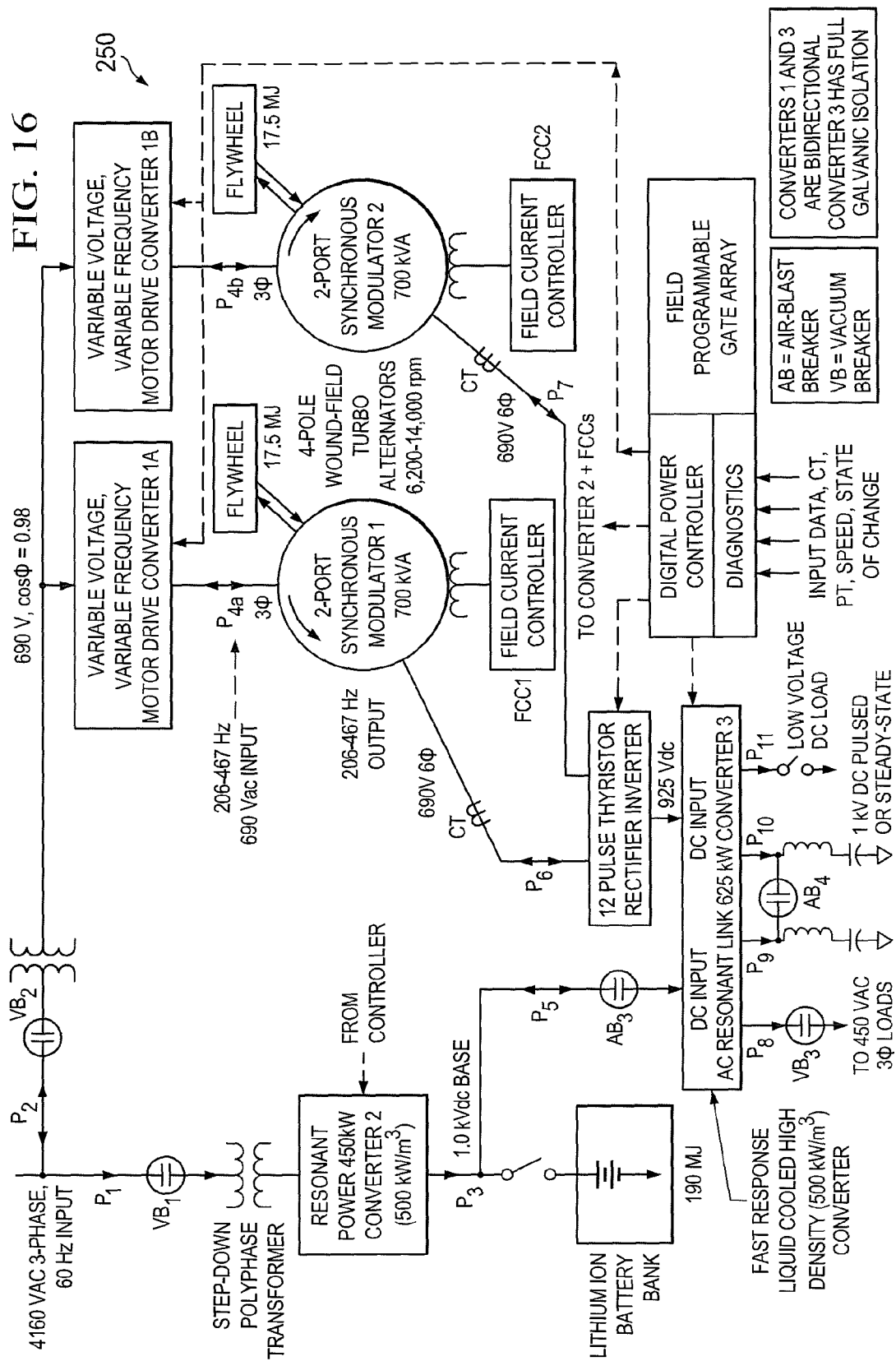
FIG. 16 shows a hybrid energy storage system layout for both steady-state and pulsed loads.

FIG. 16 shows a hybrid energy storage system layout at 250 with voltages shown appropriate to a 4160 Volt input power system and 1.0 kVDC, 140 VDC plus 450 VAC output for both steady-state and pulsed loads. System layout 250 shows a preferred embodiment for a ship or aircraft of the dual synchronous modulator hybrid energy storage system whereby a set of counter-rotating electrical machines (synchronous modulators 1 & 2) are individually powered from the AC source by converters 1A and 1B. The electrical machinery operates over a typical speed range of 6,200 rpm to 14,000 rpm which allows for extraction or regeneration of system energy in a ratio of 5.09:1. The synchronous modulators are matched in rating & speed and operate in unison but counter-rotating to reduce the torque moment on the application platform. Two DC rotor current field controllers FCC1 and FCC2 are supplied for excitation of the rotors. A preferred embodiment uses wound-rotor-field synchronous machines rather than permanent magnet machines. The AC line also powers the battery energy storage bank through Resonant AC to DC converter No. 2. The machine outputs are rectified by a common 12 pulse converter (rectifier/inverter) and subsequently feed converter No. 3 which has ability to produce either AC or DC output to the loads. The battery energy storage bank or similar ultra-capacitor bank has low voltage DC output which is an additional feed to converter No. 3 and typically used for constant current output. Converter No. 3 has ability to directly power from the synchronous modulators into the battery storage system for a controlled recharge mode. In the event that the load must quickly return energy at a rate too fast to be allowed by the battery (e.g. a 15 C rate), this energy is first routed to the electrical machine/flywheel and then slowly released to the battery bank at a 1.0 or 2.0 C rate over an extended period of time to avoid overheating/overstressing of the chemical cells.

Figure 17:
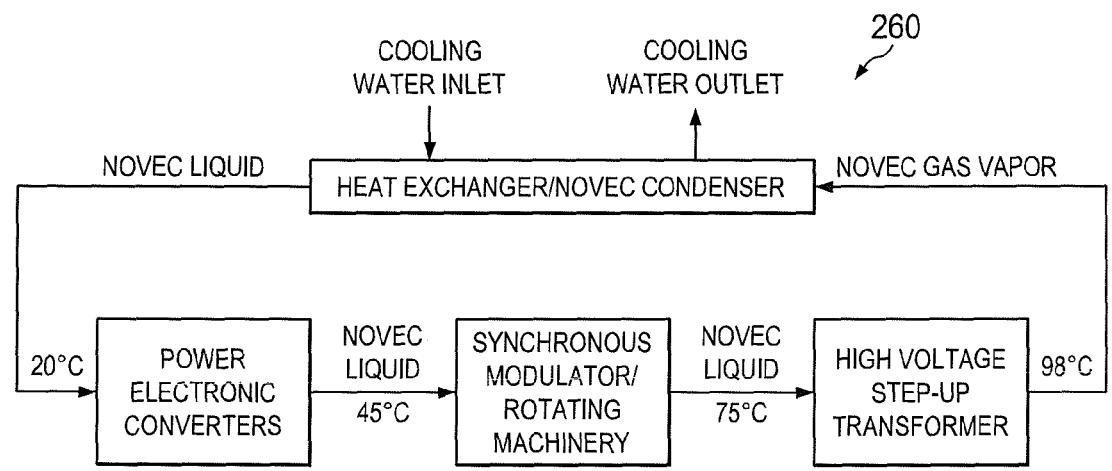
FIG. 17 shows an integrated Novec/HFE cooling scheme for a complete system whereby a common cooling loop is employed for three main subsystems having a combined system of two-phase and single-phase cooling.

FIG. 17 shows an integrated Novec/HFE, cooling scheme at 260 that is a preferred embodiment for a complete system whereby a common cooling loop is employed for three main subsystems having a combined system of two-phase and single-phase cooling as follows:

1. The initial inlet temperature of 20° C. for the Novec is used to immersion cool in a liquid phase the power electronic converters (subsystem No. 1) since these are the most temperature critical of the main subsystems and it is an objective to maintain the thyristor or IGBT semiconductor junctions at less than 100° C. The power electronic systems are allowed a 25° C. rise and outlet temperature is 45° C.
2. From subsystem No. 1, the Novec liquid is subsequently brought into the synchronous modulator/rotating machinery (subsystem No. 2) stator winding internal cooling passages at a 45° C. inlet and allowed a 30° C. rise with a 75° C. outlet, maintaining Novec in liquid state throughout. The stator windings are less heat sensitive than subsystem No. 1 and can tolerate a 75° C. outlet or slightly higher. The stator windings may comprise e.g. 12 individual windings per machine as shown in FIG. 6, 7, 9, 10, or 11 and there may be multiple machines operating on a common coolant loop. However, in this embodiment, it is not advisable to operate the machine windings in a vapor state and thus the outlet temperature of subsystem No. 2 must clearly be below the boiling point of the Novec/HFE fluid used.
3. From subsystem No. 2, the Novec liquid is injected into the step-up high voltage transformer or multiple units (subsystem No. 3) thereof described herein at 75° C. inlet but allowed to vaporize to remove the transformer winding joule losses when the temperature rise reaches 23° C. by using a Novec with a 98° C. vaporization temperature. The vapor cooled transformer can be single phase or polyphase. The use of an HFE coolant enhances the power density by reducing the size and weight of the electrical windings and further allows the magnetic core weight to be minimized. The 3M product Novec 7300 is designed for this 98° C. boiling temperature has a modest vapor pressure of 5.9 kPA and the electrical resistivity is very high at $1E^{+11}$ Ohm-cm which indicates it is excellent for use with the described high voltage equipment.

Thus, a preferred embodiment uses a combination of two phase and single phase cooling paths to best suit the individual electrical characteristics of the electrical apparatus and yield a high density system.

Modifications, additions, or omissions may be made to the systems, apparatuses, and methods described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. As used in this document, "each" refers to each member of a set or each member of a subset of a set.

To aid the Patent Office, and any readers of any patent issued on this application in interpreting the claims appended hereto, applicants wish to note that they do not intend any of the appended claims or claim elements to invoke paragraph 6 of 35 U.S.C. Section 112 as it exists on the date of filing hereof unless the words "means for" or "step for" are explicitly used in the particular claim.

What is claimed is:

1. A multi-port storage system, comprising:
    a dynamo-electric machine with integral rotor inertia forming a primary energy storage system, the dynamo-electric machine having (i) multiple primary stator windings configured to accept multiple AC inputs from multiple power sources and (ii) at least two secondary stator windings configured to deliver electric power to multiple loads at different power, frequency and voltage levels;
    a secondary energy storage system configured to store energy and coupled to the primary energy storage system, the secondary energy storage system configured to convert stored energy to electric power and to convert electric power to stored energy; and
    wherein the dynamo-electric machine is configured to buffer the secondary energy storage system and to adjust one or more charging or discharging rates of the secondary energy storage system.

2. The system as specified in claim 1, further comprising a step-up transformer coupled to one of the secondary stator windings.

3. The system as specified in claim 2, wherein the step-up transformer comprises a single-phase or polyphase step-up transformer having internal cooling and electrical insulation between the secondary stator windings comprising a hydro-fluoro-ether (HFE) vapor and liquid fluid.

4. The system as specified in claim 1, further comprising a power electronic frequency or voltage level converter coupled to the dynamo-electric machine, the converter cooled and insulated by a hydro-fluoro-ether (HFE) vapor and liquid fluid.

5. The system as specified in claim 1, wherein the primary stator windings and the secondary stator windings of the dynamo-electric machine are cooled and insulated by a hydro-fluoro-ether (HFE) liquid fluid.

6. The system as specified in claim 2, wherein the step-up transformer, a power electronic frequency or voltage level converter, and the stator windings of the dynamo-electric machine are cooled by a hydro-fluoro-ether (HFE) vapor and liquid fluid in a common cooling loop, wherein the HFE fluid is configured to transform from a fluid state to a vapor state in a last stage of use.

7. The system as specified in claim 1, wherein the dynamo-electric machine has a plurality of excitation windings, wherein a first of the excitation windings is configured for normal excitation of one or more steady-state loads and a second of the excitation windings is configured for pulsed excitation to power one or more rapidly changing or transient loads.

8. The system as specified in claim 3, wherein the step-up transformer has a primary winding and a plurality of secondary windings disposed about a common segmented core, wherein the HFE vapor and liquid fluid is disposed between sections of the segmented core.

9. The system as specified in claim 1, wherein the dynamo-electric machine further includes a tertiary excitation stator winding configured to provide a fast ramp rate for output power provided by the dynamo-electric machine, wherein the tertiary excitation stator winding of the dynamo-electric machine is configured to be excited by a polyphase system of pulse forming networks from a DC source.

10. The system as specified in claim 1, wherein the dynamo-electric machine comprises:
    a first inertial flywheel and a second inertial flywheel; and
    a first drive motor and a second drive motor configured to power the first inertial flywheel and the second inertial flywheel, respectively; and
    wherein the first drive motor and the second drive motor are electrically connected in series to equalize torque provided to the first inertial flywheel and the second inertial flywheel.

11. The system as specified in claim 10, further comprising a variable frequency drive (VFD) configured to convert a first frequency to a second higher frequency and feed the first drive motor and the second drive motor.

12. The system as specified in claim 10, wherein the first drive motor and the second drive motor are configured to:
    counter-rotate the first inertial flywheel and the second inertial flywheel, respectively; and
    operate the primary energy storage system so that speeds of the counter-rotating inertial flywheels are kept in synchronism.

13. The system as specified in claim 1, wherein the secondary energy storage system is configured to recover load energy.

14. The system as specified in claim 13, wherein:
    the primary energy storage system is configured to recover a first portion of the load energy;
    the secondary energy storage system is configured to recover a second portion of the load energy; and
    the first portion represents a majority of the load energy.

15. The system as specified in claim 3, further comprising a heat exchanger/condenser configured to process the HFE vapor and liquid fluid.

16. The system as specified in claim 1, wherein the primary stator windings of the dynamo-electric machine are configured to accept the multiple AC inputs from the multiple power sources simultaneously.

17. The system as specified in claim 1, wherein different segments of the primary stator windings are configured to accept different phases of the AC inputs or different voltage levels from the multiple power sources.

18. The system as specified in claim 1, wherein the dynamo-electric machine comprises a wound-field synchronous electrical machine.

19. A multi-port energy storage system, comprising:
two or more energy storage devices having different time constants and different rates of energy delivery/energy recovery;
a converter configured to step-up an AC voltage level of each of the energy storage devices and create an AC output voltage that is galvanically isolated from an input source;
a rectifier configured to rectify the AC output voltage to a higher voltage DC voltage;
a control system having excitation systems and configured to transfer control from a low response mode to a high response mode in order to change at least one of the excitation systems from a slow response field exciter to a fast response field exciter; and
a limiter configured to limit electrical fault energy in the AC output voltage and a DC output voltage.

20. The system as specified in claim 19, wherein the excitation systems comprise:
a DC slow response field exciter configured to power a rotating DC field winding; and
a supplemental fast response exciter configured to be responsive to a pulse forming network (PFN) and configured to power a tertiary polyphase winding located on a dynamo-electric machine stator to aid in fast output control.

21. The system as specified in claim 20, wherein excitation power of the fast response exciter is configured to be derived from an output or load energy and used in a regenerative circuit.

22. The system as specified in claim 21, wherein the excitation power of the fast response exciter is configured to be derived from a DC storage source comprising a polyphase system of excitation formed by sequential firing of switches.

23. The system as specified in claim 22, wherein the switches comprise power electronic switches.

* * * * *